United States Patent
Aritake et al.

(12) United States Patent (10) Patent No.: US 6,690,516 B2
Aritake et al. (45) Date of Patent: Feb. 10, 2004

(54) HEAD MOUNT TYPE DISPLAY DEVICE

(75) Inventors: Hirokazu Aritake, Kawasaki (JP); Junji Tomita, Kawasaki (JP); Seiichi Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/772,745

(22) Filed: Jan. 30, 2001

(65) Prior Publication Data

US 2001/0010598 A1 Aug. 2, 2001

(30) Foreign Application Priority Data

Jan. 31, 2000 (JP) ..................................... 2000-022914
Oct. 31, 2000 (JP) ..................................... 2000-333380

(51) Int. Cl.[7] ............................................. G02B 27/14
(52) U.S. Cl. ...................................................... 359/630
(58) Field of Search ................................. 359/630, 631, 359/633, 618, 629, 632; 362/268

(56) References Cited

U.S. PATENT DOCUMENTS

| 5,224,198 A | | 6/1993 | Jachimowicz et al. ...... 385/133 |
|---|---|---|---|
| 5,371,556 A | | 12/1994 | Suwa et al. ................. 351/158 |
| 5,426,521 A | * | 6/1995 | Chen et al. ..................... 359/9 |
| 5,453,877 A | | 9/1995 | Gerbe et al. ................ 359/633 |
| 5,499,138 A | | 3/1996 | Iba ............................. 359/569 |
| 5,579,161 A | * | 11/1996 | Sekiguchi ................... 359/559 |
| 5,757,544 A | * | 5/1998 | Tabata et al. ............... 359/434 |
| 5,909,325 A | | 6/1999 | Kuba et al. .................. 359/384 |
| 6,046,857 A | | 4/2000 | Morishima .................. 359/630 |

FOREIGN PATENT DOCUMENTS

| JP | 2-297516 | 12/1990 |
|---|---|---|
| JP | 5-134208 | 5/1993 |
| JP | 5-210069 | 8/1993 |
| JP | 5305645 | 11/1993 |
| JP | 5-328261 | 12/1993 |
| JP | 7-046513 | 2/1995 |
| JP | 9-73043 | 3/1997 |
| JP | 9-189880 | 7/1997 |
| JP | 11-064781 | 3/1999 |
| JP | 29-10111 | 4/1999 |

* cited by examiner

Primary Examiner—Ricky Mack
(74) Attorney, Agent, or Firm—Greer, Burns & Crain, Ltd.

(57) ABSTRACT

The head mount type display device includes an optical system having a light emitting element, a display element illuminated by the light emitting element, and an image forming element 20 for producing an image. The display element is arranged between the image forming element and the first focal point of the image forming element at a position nearer to the first focal point of the image forming element. A virtual image of the display element is formed by the image forming element 20 and the light emitted by the light emitting element is focussed on a second focal point of the image forming element. It is designed such that the eye of an observer is located on the second focal point when use. In another form, the optical system includes first and second elliptical concave mirrors with respective ones of focal points arranged at a common position.

4 Claims, 22 Drawing Sheets

HEAD MOUNT TYPE DISPLAY DEVICE

BACKGROUND OF THE INVENTION

1. Field of the Invention

The present invention relates to a display device called a head mount type display device or a spectacle-type display device for seeing an image of a display element such as a liquid crystal display element arranged immediately in front of the eye of the observer.

2. Description of the Related Art

A display device of this type is disclosed, for example, in Japanese Unexamined Patent Publications No. 5-134208, No. 5-210069, No. 5-328261, No. 7-46513, No. 9-189880, No. 11-64781 and Patent No. 2910111. Further, a display device including a light guide member is disclosed in Japanese Unexamined Patent Publications No. 2-297516, No. 5-304645 and No. 9-73043.

The display apparatus of this type comprises a display element such as a liquid crystal panel and an image-forming element such as a convex lens or a concave mirror for magnifying the image formed by the display element. FIG. 14 in the accompanying drawings is a view showing an optical system of the conventional spectacle-type display device. In FIG. 14, numeral 1 designates a display element, numeral 2 an image forming element, numeral 3 a virtual image of the display element 2 magnified by the image forming element 2, and numeral 4 the eye of an observer. The diffused light is illuminated on the display element 1, and the light passing through the display element 1 enters the pupil 4 of the observer through the image forming element 2. Thus, the observer can see the virtual image 3 of the display element 1 magnified by the image forming element 2. A diffusion surface 1a for generating the scattered light is arranged on the side of the display element nearer to the incident light source.

A fluorescent tube is used as a light source in this case. The fluorescent tube is large and heavy, and therefore it is difficult to use the fluorescent tube as the spectacle-type display device arranged immediately before the eye of the observer.

FIG. 15 shows an example in which a light emitting element 6 is used as a substantial point light source. The light emitting element 6 emits the divergent light. The divergent light that has passed through the display element 1 enters the pupil 4 of the observer as a convergent light through the image forming element 2. In this case, the divergent light is irradiated on the display element 1, and therefore the image forming element 2 is required to be arranged at a position near the display element 1. In view of the fact that the image forming element 2 is arranged at a position near the display element 1, however, the aberration increases to such an extent that the image quality is deteriorated. For this reason, as shown in FIG. 16, a plurality of image forming elements 2 and 2a are required to be arranged in order to improve the display quality. As a result, the problem is posed that the display device increases in size and becomes heavy as a whole.

Also, Japanese Unexamined Patent Publication No. 5-134208 described above proposes the use of an elliptical member having two focal points in order to realize a display device of a reduced size. Specifically, as shown in FIG. 17, a concave mirror 8 is formed utilizing a part of an elliptical member 7, so that the light passing through the display element 1 and a group of eccentric lenses 2x passes through the first focal point P1 of the elliptical member 7, the light reflected by the concave mirror 8 passes through the second focal point P2, and the pupil 4 of the observer is arranged at the second focal point P2. By doing so, the light passing through the first focal point is reflected by the concave mirror 8, surely passes through the second focal point 2 and enters the pupil 4.

In the display device shown in FIG. 17, however, the display element 1 and the eccentric lenses 2x are located beside the pupil 4 of the observer 4 and are liable to interfere with the side of the head (the portion near the ear) of the observer when the observer wears the display device. For this reason, the display device is required to be configured so that the display element 1 and the eccentric lenses 2x may not interfere with the side of the head of the observer, and therefore the display device cannot be sufficiently reduced in size.

Also, in the configuration utilizing two focal points of the elliptical member 7, the display screen is liable to be distorted. Specifically, the angle of the light diverging from the first focal point P1 fails to coincide with the angle of the light focussed on the second focal point P2. Thus, in order that the angle of the light entering the pupil 4 may become the same as the angle of the light passing through the display element 1, a plurality of complicated eccentric lenses are required to be arranged as the eccentric lenses 2x in the neighborhood of the display element 1. This poses the problem that the display device cannot be sufficiently reduced in size.

SUMMARY OF THE INVENTION

The present invention is intended to solve the aforementioned problems and the object thereof is to provide a display device which can be reduced in size and by which the observer can watch an image immediately before his eye.

Another object of the present invention is to provide a display device in which the image can be seen immediately in front of the eye of the observer and which can be configured in a manner not to interfere with the side of the head of the observer.

According to the present invention, there is provided a display device arranged in front of an eye of an observer comprising a light emitting element, a display element illuminated by the light emitting element, and an image forming element allowing the light passing through the display element to pass therethrough, wherein the display element is arranged between the image forming element and a first focal point at a position near the first focal point of the image forming element, whereby a virtual image of the display element is formed by the image forming element, and the light emitted from the light emitting element is focussed at a second focal point of the image forming element.

With this configuration, the image is focussed on the pupil of the observer and even a near virtual image is sufficiently visible as in a pinhole camera, thereby making it possible to provide a compact, inexpensive display device.

Further, according to another aspect of the present invention there is provided a display device comprising a display element, an image forming element, a first concave mirror formed as a part of a first elliptical member having a first focal point through which a light emitted from said display element and passing through said image forming element passes and a second focal point, and a second concave mirror formed as a part of a second elliptical member having a third focal point arranged at a position common to said second focal point and a fourth focal point, wherein the light emitted from said display element is focussed on or near said first focal point, the light passing through said first focal point is reflected by said first concave mirror and proceeds toward the common second and third focal points, and the light passing through said second and third focal points or the light equivalent thereto is reflected by said second concave mirror and focussed on or near said fourth focal point, so that the eye of the observer can be arranged on or near said fourth focal point to see an image on display formed in front of the eye of the observer.

With this configuration, by forming the first concave mirror and the second concave mirror using the first elliptical member and the second elliptical member with the second focal point and the third focal point located at the common position, and more preferably, by forming the first elliptical member and the second elliptical member as equivalent ellipsoid of revolutions, the symmetry of the optical system can be improved, and the need of using a plurality of complicated eccentric lenses is eliminated, unlike in the prior art, and the whole display device can be reduced in both size and weight.

Further, the present invention provides a display device with the aforementioned two features combined.

Furthermore, according to a further aspect of the present invention, there is provided a display device arranged in front of an eye of an observer comprising a display element, an image forming element for focussing a light emitted from the display element, a light guide element having an incident surface to which the light passing through the image forming element is made incident, and a concave mirror arranged on the light guide member for receiving the light passing through the light guide, wherein the concave mirror is formed as a part of an elliptical member having a first focal point and a second focal point, and the light passing through said image forming element is reflected a plurality of times in the light guide member and made incident to the concave mirror as if the light was made incident to said concave mirror from the second focal point, and the light reflected by said concave mirror is focussed on or near the first focal point, thereby entering the eye of the observer.

With this configuration, a compact display device having a simple structure can be obtained. In this case, the light guide member includes a pair of flat surfaces in opposed relation to each other, and an inclined surface at an angle to the flat surfaces. Preferably, the light passing through the image forming element is focussed on the inclined surface and reflected by a pair of the flat surfaces in opposed relation to each other. Also, preferably, the incident surface is the inclined surface or a part of the flat surfaces and the light made incident to the incident surface is reflected by the inclined surface.

Further, according to a further aspect of the present invention, there is provided a display device arranged in front of an eye of the observer comprising a display element, an optical element for converting a light illuminating said display element or a light passing through said display element into a substantially parallel light, and a concave mirror to which the light passing through said optical element is made incident, wherein said concave mirror is formed as a part of a paraboloid of revolution, and the light reflected by said concave mirror is focussed on or near the focal point of said paraboloid of revolution, thereby entering the eye of the observer.

With this configuration, a compact display device with a simple structure can be obtained. In this case, the optical element is preferably configured of another concave mirror formed as a part of the paraboloid of revolution. Also, the first concave mirror and the second concave mirror are preferably arranged on a light guide member.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

The embodiments of the present invention will now be explained with reference to the drawings.

Figure 3:
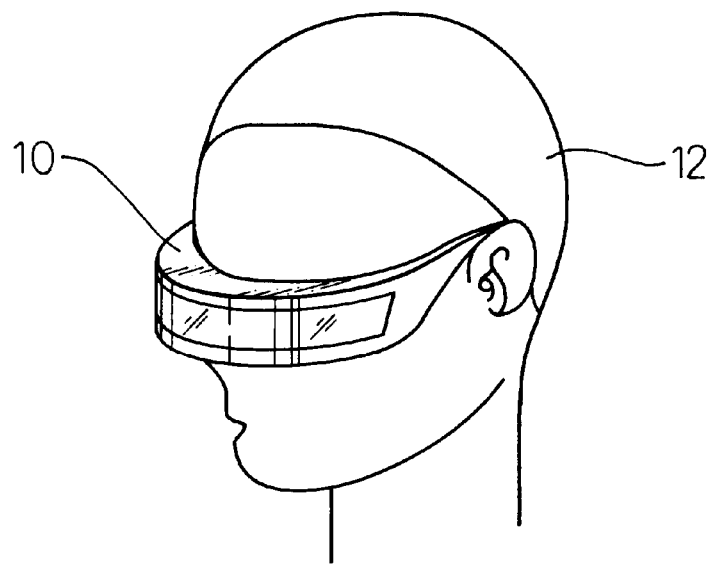
FIG. 3 is a perspective view showing a display device, as viewed from in front of the observer, according to the present invention.

FIG. 3 shows a display device 10 called a head-mount display or a spectacle-type display for seeing an image immediately in front of the eye of the observer 12. This display device 10 is of a spectacle type mounted on the face of the observer 12. The display device 10 comprises a spectacle-like body structure to be mounted on the face of the observer 12 and an optical system incorporated in the body structure. In this example, the body structure of the display device is shown as a spectacle or goggles. Nevertheless, the present invention is not limited to the display device having a body structure like a spectacle or goggles. Instead, various types of the body structure of the display device can be employed, such as a belt bound around the head, a helmet or a structure like a Katyusha (head ornament), or of ear-hung type, a clip mounted on the spectacle, etc.

Figure 1:
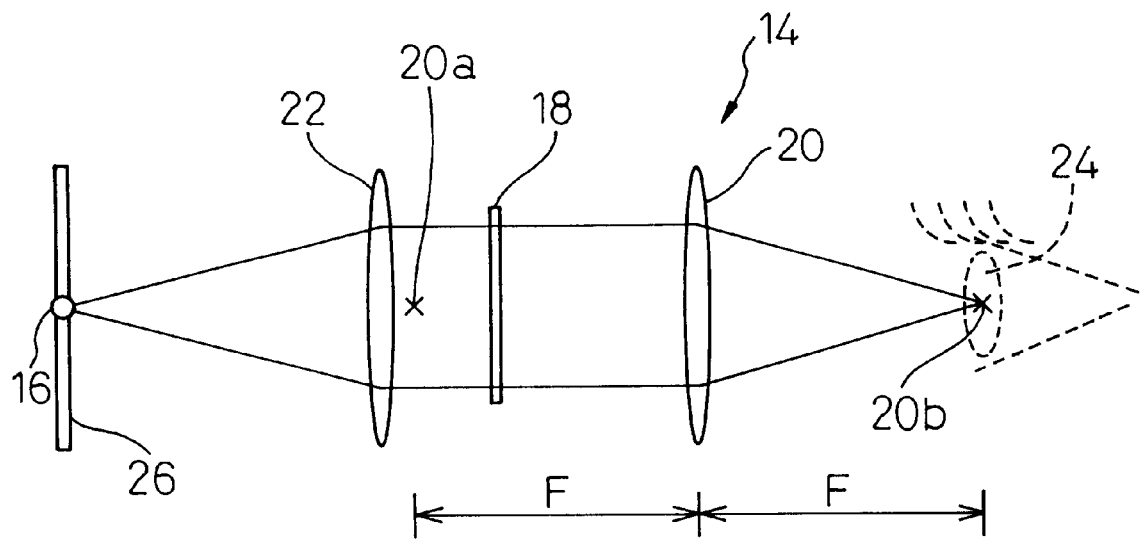
FIG. 1 is a view showing a first embodiment of an optical system of a display device of FIG. 3.

FIG. 1 is a view showing an optical system 14 of the display device 10 according to the first embodiment of the present invention. The optical system 14 includes a light emitting element 16, a transmission type display element 18 illuminated by the light emitting element 16, and an image forming element 20 allowing the light passing through the display element 18 to pass therethrough. Further, an optical element 22 is interposed between the light emitting element 16 and the display element 18. Numeral 24 designates the pupil of the observer 12.

The light emitting element 16 is substantially a point light source arranged in a small opening in a mask 26. The display element 18 can be a display unit of any type which can form an image in accordance with an electrical signal. Both the image forming element 20 and the optical element 22 are configured with convex lenses. The light emitting element 16 is arranged at the position of the focal point of the optical element 22 so that the divergent light emitted from the light emitting element 16 enters the display element 18 as parallel light rays.

The image forming element 20 has a first focal point 20a on one side thereof and a second focal point 20b on the other side thereof. Character F designates the focal length of the image forming element 20. The display element 18 is arranged between the image forming element 20 and the first focal point 20a at a position near to the first focal point 20a of the image forming element 20. As a result, a virtual image of the display element 18 is formed by the image forming element 20. Further, the light emitted from the light emitting element 16 is focussed on the second focal point 20b of the image forming element 20. In other words, the image of the light emitting element 16 is formed at the second focal point 20b of the image forming element 20.

The display device 10 is designed such that the second focal point 20b of the image forming element 20 is located at the pupil 24 when the display device 10 is mounted on the face of the observer 12. As a result, the convergent light is focused to the greatest degree at the pupil 24 of the observer 12.

Figure 2:
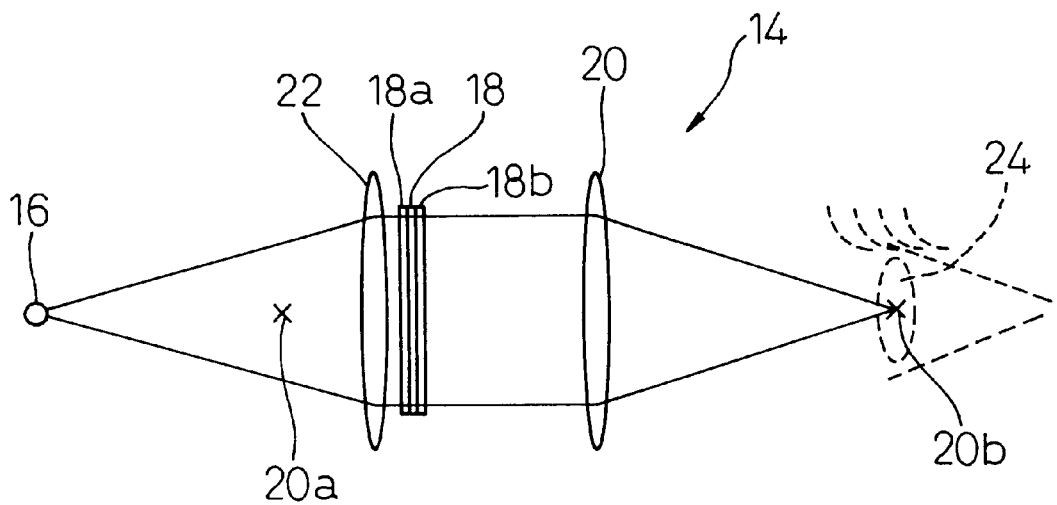
FIG. 2 is a view showing a modification of the optical system of FIG. 1.

FIG. 2 is a view showing a modification of the optical system 14 shown in FIG. 1. The optical system 14 shown in FIG. 2 includes members similar to those of the optical system 14 shown in FIG. 1, and operates substantially in a similar way to the optical system 14 of FIG. 1. In FIG. 2, the light emitting element 16 comprises a light emitting diode constituting a point light source, and the display element 18 includes a liquid crystal panel sandwiched by polarizers 18a and 18b. The optical element 22 is arranged nearer to the display element 18 than to the first focal point 20a of the image forming element 20. Thus, the optical system 14 of FIG. 2 can be constructed shorter than the optical system 14 of FIG. 1.

Figure 4:
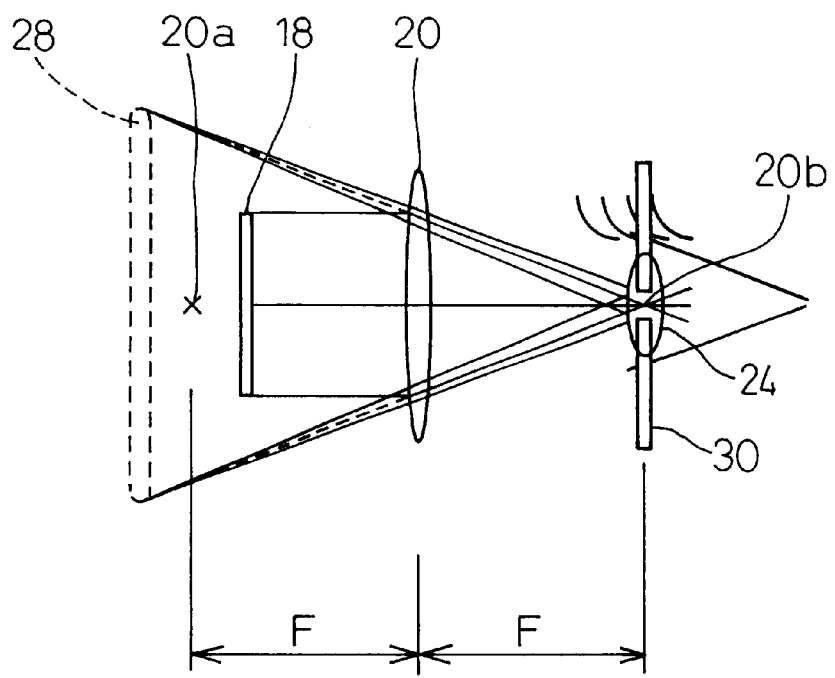
FIG. 4 is a view explaining the operation of the optical system of FIGS. 1 and 2.

FIG. 4 is a view explaining the operation of the optical system 14 of FIGS. 1 and 2. As described above, the parallel light rays enter the display element 18, which is arranged between the image forming element 20 and the first focal point 20a at a position nearer to the first focal point 20a of the image forming element 20. Since the display element 18 is arranged between the image forming element 20 and the first focal point 20a of the image forming element 20, the virtual image 28 of the display element 18 is formed by the image forming element 20. In addition, the display element 18 is arranged at a position nearer the first focal point 20a of the image forming element 20 under the conditions that the virtual image 28 is formed. That is, the display element 18 is arranged remote from the image forming element 20 so as not to deteriorate the image quality by a reduction of the resolution. Preferably, the display element 18 is arranged at a position at least one half of the focal length of the image forming element 20 away from the image forming element 20. According to this embodiment, the focal length of the image forming element 20 is 22 mm, and the display element 18 is arranged at a position 12 mm away from the image forming element 20.

Therefore, the display device 10 is designed such that the image of the light emitting element 16 is formed at the second focal point 20b of the image forming element 20 and the second focal point 20b of the image forming element 20 is located at the pupil 24 when the display device 10 is mounted on the face of the observer 12. As a result, the convergent light is focussed to the greatest degree at the pupil 24 of the observer 12, so that the observer sees an image on display in the same manner as if the observer sees the image through a pinhole formed in a wall 30.

Figure 14:
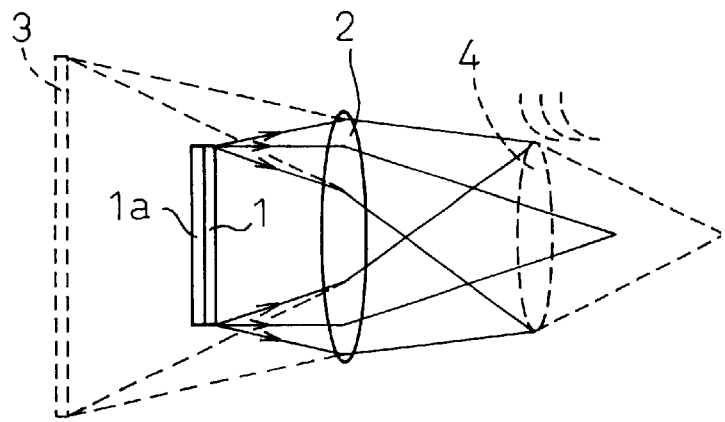
FIG. 14 is a view showing an optical system of a conventional spectacle-type display device.
Figure 15:
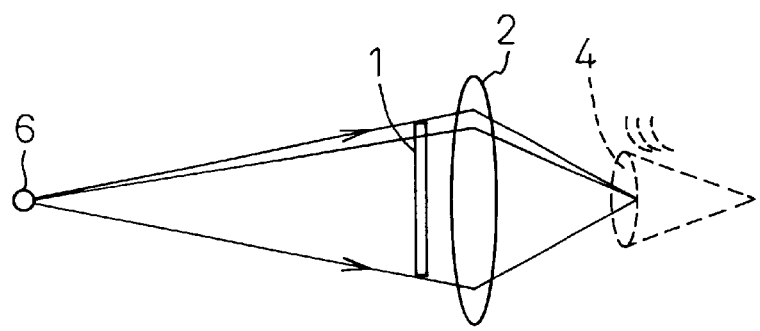
FIG. 15 is a view showing another conventional example.
Figure 16:
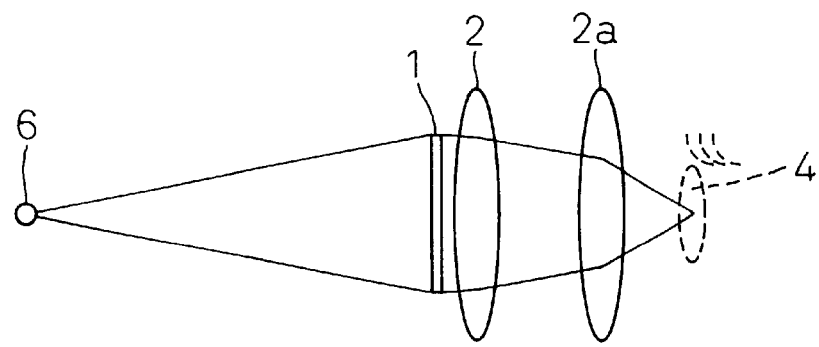
FIG. 16 is a view showing a further conventional example.
Figure 17:
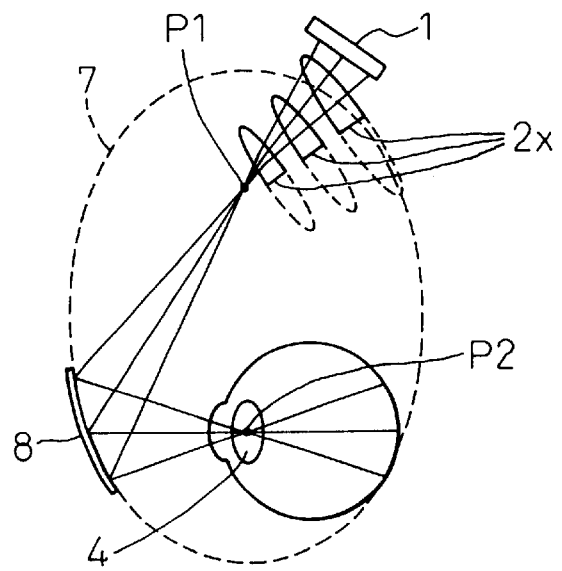
FIG. 17 is a view showing a further conventional example having an optical system formed based on an elliptical member.

Assuming that the eye of the human being is a camera and there is a pinhole at the pupil 24, it is possible to clearly see even a near image according to the principle of a pinhole camera. In the present invention, a virtual pinhole is formed optically, instead of physically forming a pinhole. In view of the fact that the display element 18 is arranged in the vicinity of the first focal point 20a of the image forming element 20, the observer 12 can see the virtual image 28 of the display element 18 as clearly as if it is seen with the pinhole camera. Normally, a virtual image located near the eye of the observer is hard to see. By application of the principle of the pinhole camera, however, the focal depth is increased so that a virtual image can be seen even in the case where the distance from the eye to the virtual image is not very large. On the other hand, as explained with reference to FIG. 14, in the case where the light with a certain width enters the pupil without being reduced, the virtual image cannot be seen clearly unless the distance from the eye to the virtual image is somewhat long. Therefore, the optical system is normally so configured that a larger virtual image is formed at a position a greater distance away from the pupil. According to the present invention, the configuration described above makes it possible to fabricate a compact optical system at a lower cost.

Figure 5:
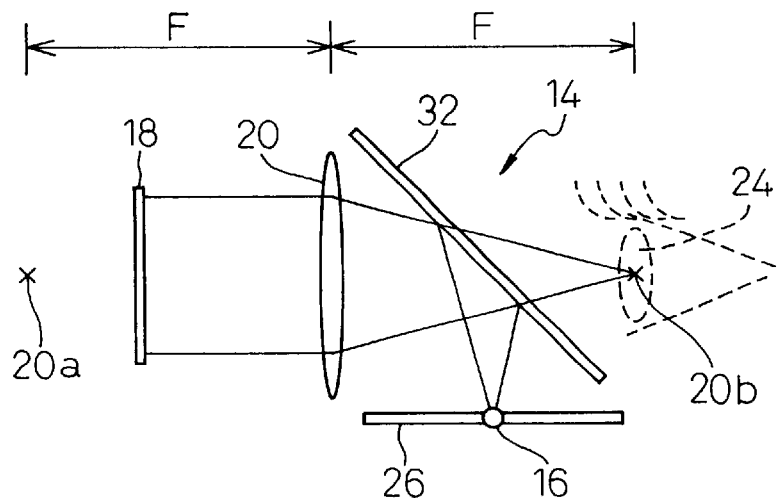
FIG. 5 is a view showing a modification of the optical system of FIG. 1.

FIG. 5 is a view showing a modification of the optical system 14 shown in FIG. 1. The optical system 14 of FIG. 5 includes members similar to those of the optical system 14 of FIG. 1, and the operation of the optical system 14 shown in FIG. 5 is substantially the same as that of the optical system 14 shown in FIG. 1. In FIG. 5, the display element 18 comprises a reflection-type display element, and a half mirror 32, as a light splitting means for transmitting part of the light and reflecting the remaining part of the light, is interposed between the light emitting element 16 and the display element 18. Part of the divergent light emitted from the light emitting element 16 is reflected by the half mirror 32, passes through the image forming element 20, and irradiates the display element 18. The light reflected by the display element 18 passes through the image forming element 20 and the half mirror 32 and proceeds toward the pupil 24 of the observer 12.

When the light travels from the light emitting element 16 through the half mirror 32 to the display element 18, the divergent light is converted into parallel light rays by the image forming element 20. Therefore, the image forming element 20 also has the function of the optical element 22 of FIG. 1. In other words, the optical element 22 and the image forming element 20 are configured of a common element. When the light proceeds from the half mirror 32 toward the pupil 24, the image of the light emitting element 16 is formed at the second focal point 20b of the image forming element 20.

Figure 6:
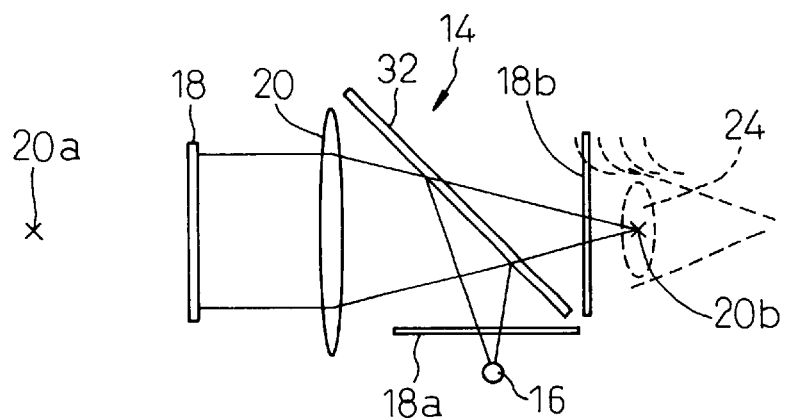
FIG. 6 is a view showing a modification of the optical system of FIG. 5.

FIG. 6 is a view showing a modification of the optical system 14 shown in FIG. 5. The optical system 14 of FIG. 6 includes members similar to those of the optical system 14 of FIG. 5, and the operation of the optical system of FIG. 6 is substantially the same as that of the optical system 14 of FIG. 5. In FIG. 6, the display element 18 is formed as a liquid crystal panel, and polarizers 18a and 18b are arranged on the incident and exit sides of the display element 18. The polarizer 18a is arranged between the light emitting element 16 and the half mirror 32, while the polarizer 18b is interposed between the half mirror 32 and the pupil 24.

Figure 7:
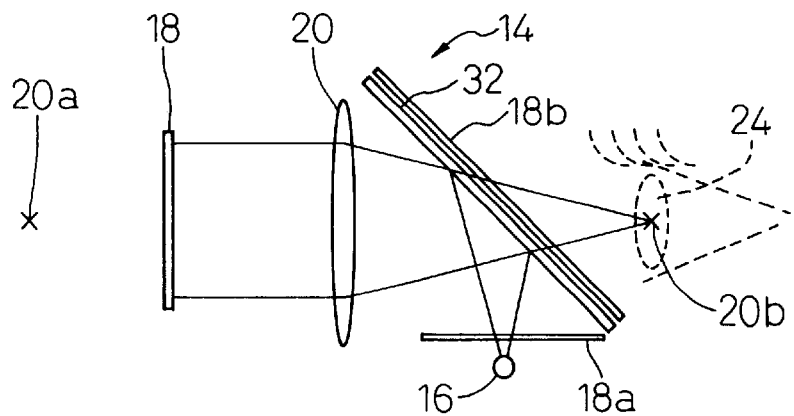
FIG. 7 is a view showing a modification of the optical system of FIG. 6.

FIG. 7 is a view showing a modification of the optical system 14 of FIG. 6. The optical system 14 of FIG. 7 includes members similar to those of the optical system 14 of FIG. 6, and the operation of the optical system 14 of FIG. 7 is substantially the same as that of the optical system 14 of FIG. 6. In FIG. 7, the polarizer 18a is arranged between the light emitting element 16 and the half mirror 32, while the polarizer 18b is bonded to the half mirror 32.

Figure 8:
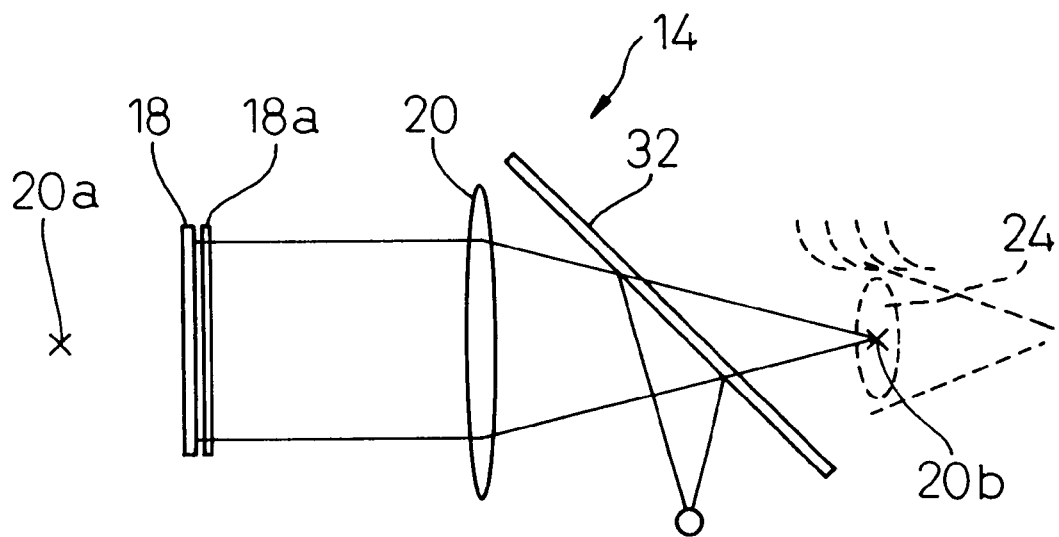
FIG. 8 is a view showing a modification of the optical system of FIG. 7.

FIG. 8 is a view showing a modification of the optical system 14 of FIG. 6. The optical system 14 of FIG. 8 includes members similar to those of the optical system 14 of FIG. 6, and the operation of the optical system 14 of FIG. 8 is substantially the same as that of the optical system 14 of FIG. 6. In FIG. 8, the polarizer 18a is arranged on the light incident surface side of the display element 18. This example is applicable also to the display element 18 which can perform the display operation with a reflection-type liquid crystal such as a ferroelectric liquid crystal and a single polarizer.

Figure 9:
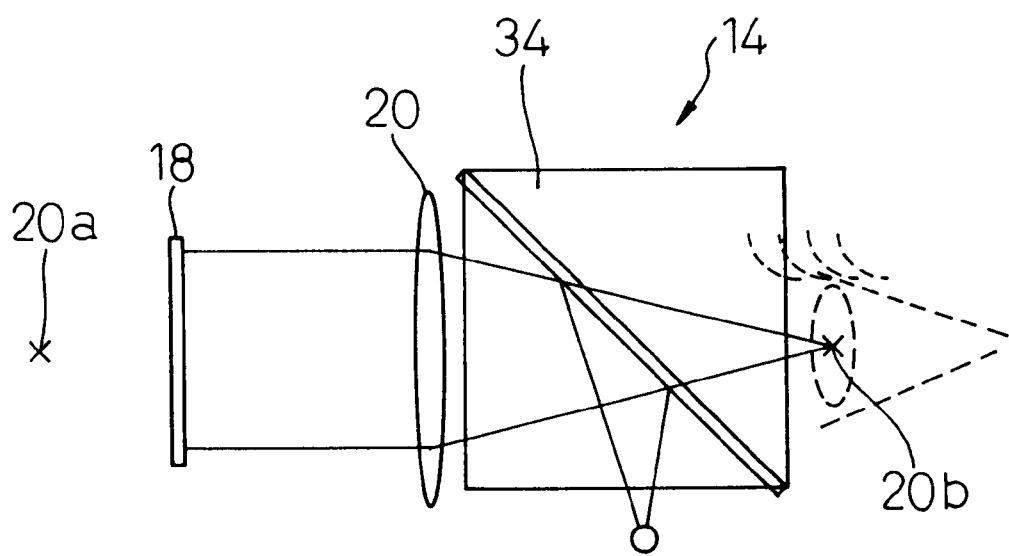
FIG. 9 is a view showing a modification of the optical system of FIG. 5.

FIG. 9 is a view showing a modification of the optical system 14 of FIG. 5. The optical system 14 of FIG. 9 includes members similar to those of the optical system 14 of FIG. 5, and the operation of the optical system 14 of FIG. 9 is substantially the same as that of the optical system 14 of FIG. 5. In FIG. 9, a polarization beam splitter 34 is arranged in place of the half mirror 32 of FIG. 5. The polarization beam splitter 34 operates as light splitting means allowing one of the polarized lights to pass therethrough and reflecting the other polarized light. The use of the polarization beam splitter 34 makes it possible to omit the polarizers 18a and 18b of FIGS. 6 to 8 and thus reduce the loss of the amount of light. Also, the polarization beam splitter 34 can be replaced by a film for reflecting a specific polarized light (such as DBEF or HMF of 3M Corporation).

Figure 10:
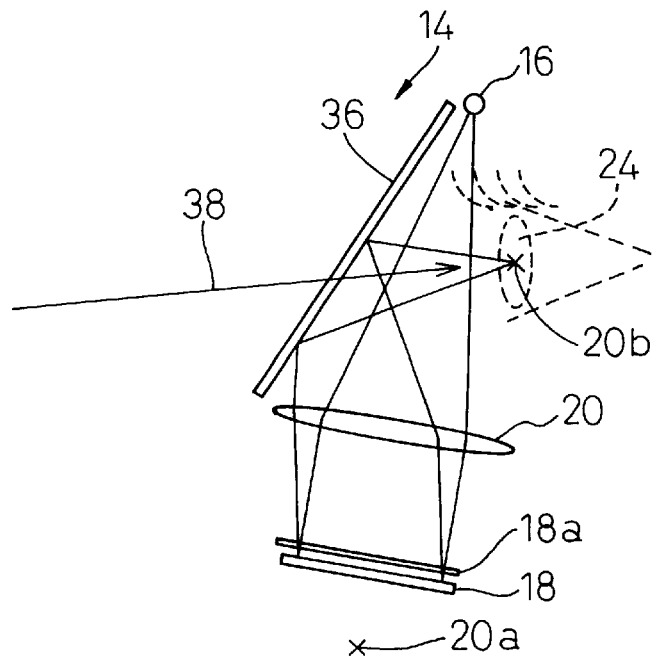
FIG. 10 is a view showing an optical system used with a display device having the see-through function.

FIG. 10 is a view showing an optical system 14 used in a display device having a see-through function. The light emitted from the light emitting element 16 is made incident directly to the image forming element 20 and the display element 18, and the light reflected by the display element 18 is reflected by a half mirror 36 and enter the pupil 24 of the observer 12. An external light 38 transmits through the half mirror 36 and enters the pupil 24 of the observer 12. Thus, the observer 12 can see items such as a computer keyboard through the half mirror 36 as well as the image on display. One polarizer 18a is arranged in front of the display element 18, but the polarizer can be arranged in the vicinity of the light emitting element or the half mirror 36, as required. By the way, in the case where the light from the external environment is dazzling, a light modulation panel (liquid crystal panel, etc.) can be arranged outside of the half mirror 36. In this way, a combiner can be configured which combines the light from an external source and the light from the display element 18.

Figure 11:
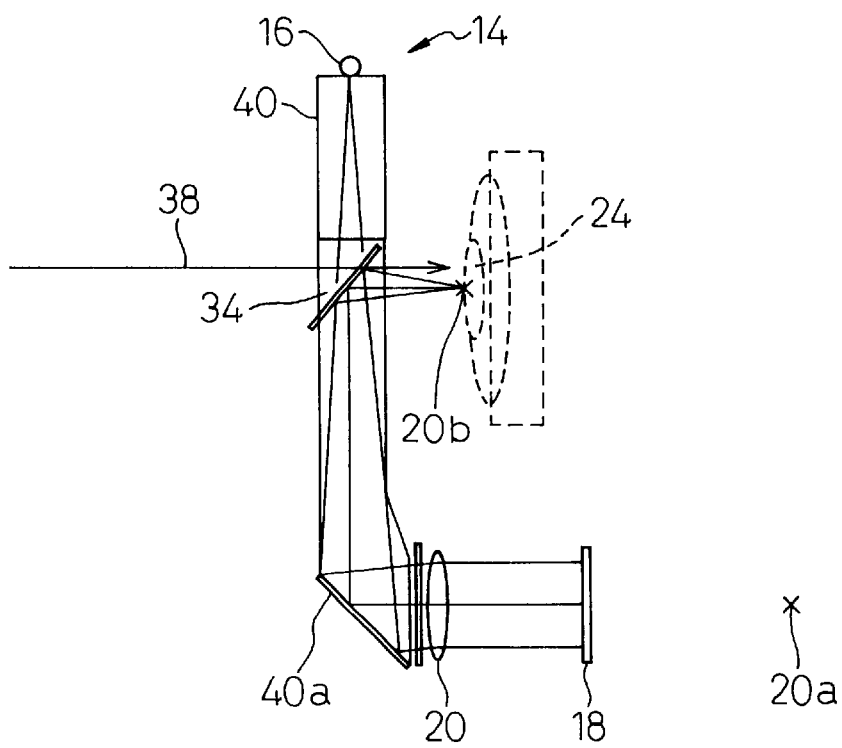
FIG. 11 is a view showing a modification of the optical system of FIG. 10.

FIG. 11 is a view showing a modification of the optical system of FIG. 10. In this example, the optical system includes a light guide plate 40 of transparent plastic and the polarization beam splitter 34 is formed in the intermediate portion of the light guide plate 40. The light emitting element 16 is arranged at the end of the light guide plate 40 and the other end of the light guide plate 40 forms a prism 40a to bend the light at right angles. The light emitted from the light emitting element 16 is transmitted through the light guide plate 40 and the polarization beam splitter 34, is reflected by the prism 40a, is transmitted through the image forming element 20 and is reflected by the display element 18, and travels along the inverse route, in which the light is reflected by the polarization beam splitter 34, and enters the pupil 24 of the observer 12. The external light 38 enters the pupil 24 of the observer 12 through the polarization beam splitter 34. Thus, the observer 12 can see outside through the polarization beam splitter 34 as well see as the displayed image. The light guide plate 40 is so thin that it can be easily arranged in front of the eye or mounted on the spectacle after the manufacture thereof.

In the display device according to the present invention, the light is focussed at one point, and therefore the position for observation is limited (the field of view is narrow). In the case where the display device according to the present invention is mounted on the spectacle or the like, therefore, it is preferable to arrange the display device such that the position of the light emitting point of the light emitting element 16 is adjustable and an image of the light emitting element 16 is formed at an appropriate position (the position of the pupil of the observer).

Figure 12:
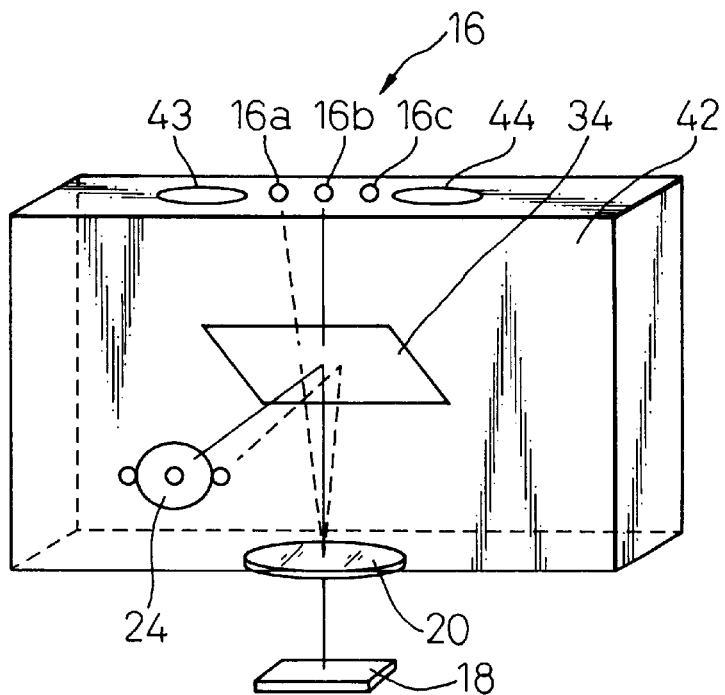
FIG. 12 is a view showing an example of an optical system having the function of adjusting the position of the light emitting point of a light emitting element.
Figure 13:
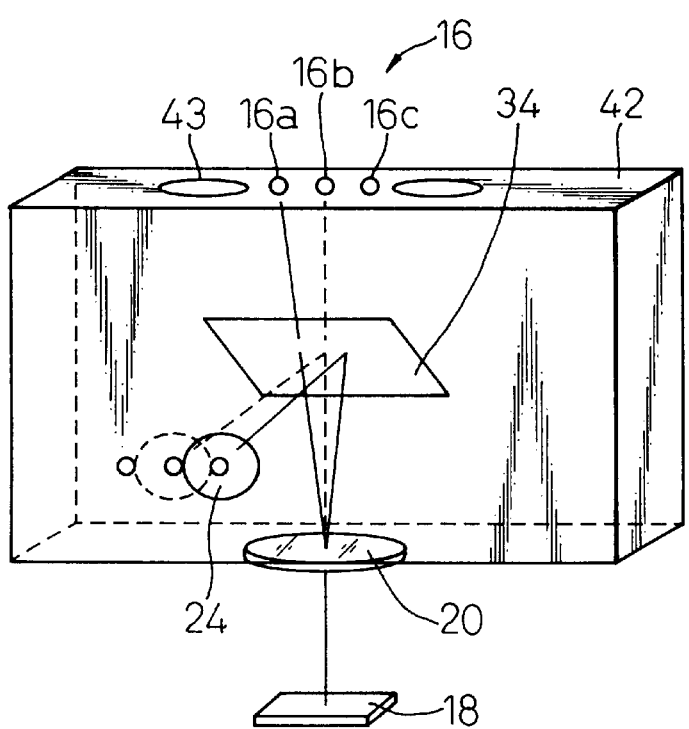
FIG. 13 is a view showing the optical system of FIG. 12 under another condition.

FIGS. 12 and 13 are views showing an example of an optical system having the function of adjusting the position of the light emitting point of the light emitting element 16. FIG. 12 shows the optical system under a certain condition, and FIG. 13 the optical system of FIG. 12 under another condition. The optical system includes a light guide plate 42 of transparent plastic, and the polarization beam splitter 34 is formed in the intermediate portion of the light guide plate 42. The light emitting element 16 is arranged at the end of the light guide plate 42, and the image forming element 20 and the display element 18 are arranged on the other end side of the light guide plate 42.

Eye position sensors 43 and 44 are arranged on the light guide plate 42, and are adapted to detect the position of the pupil 24 of the observer 12. The light emitting element 16 is formed as an LED array and includes a plurality of LEDs 16a, 16b and 16c. The pitch at which the LEDs 16a, 16b and 16c are arranged is not more than the size of the pupil 24. In accordance with the position of the pupil 24 detected by the eye position sensors 43 and 44, any of the LEDs 16a, 16b and 16c to be used is selected.

In FIG. 12, the central LED 16b is selected, and the light emitted from the LED 16b transmits through the light guide plate 42, the polarization beam splitter 34 and the image forming element 20, is reflected by the display element 18 and, further, travels through the inverse route, in which the light is reflected by the polarization beam splitter 34, and enters the pupil 24 of the observer 12.

In FIG. 13, the pupil 24, indicated by dotted line, moves to the position of the pupil 24 indicated by solid line. The left LED 16a is then selected, and the light emitted from the LED 16a is transmitted through the light guide plate 42, the polarization beam splitter 34 and the image forming element 20, and is reflected by the display element 18, and further travels through the inverse route, in which the light is reflected by the polarization beam splitter 34, and enters the pupil 24 of the observer 12. In this way, even for a display device of the type wherein the light is focused at one point, the field of view can be widened. Although the light emitting element 16 is formed as a one-dimensional LED array, it can alternatively be formed as a two-dimensional LED array with equal effect.

Incidentally, it is also possible to realize a time division color image in which the color image of one of the RGB pixels of the display element 18 is displayed, and according to the displayed image, the light emitting element 16 is activated thereby to change the color sequentially.

Figure 18:
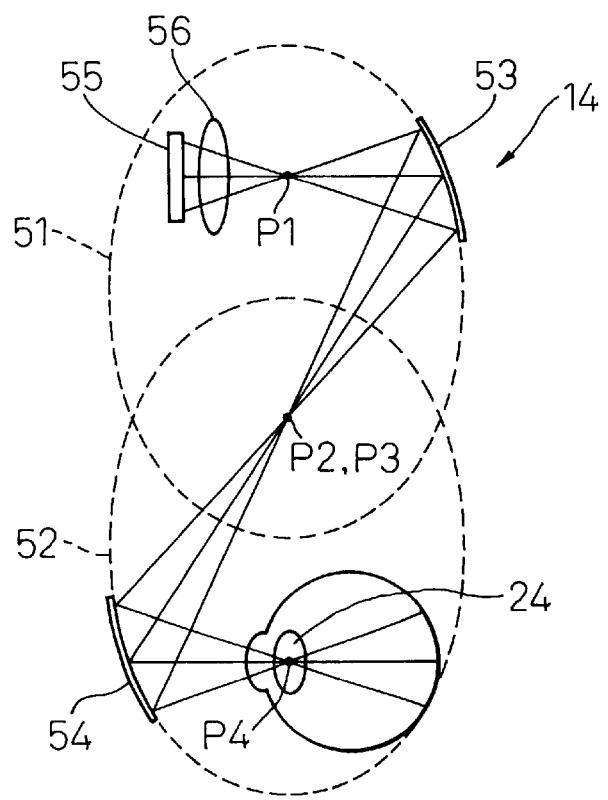
FIG. 18 is a view showing a second embodiment of the optical system of the display device of FIG. 3.

FIG. 18 is a view showing the second embodiment of the optical system of the display device of FIG. 3. The optical system 14 in this example is formed based on two equivalent elliptical members 51 and 52. The first elliptical member 51 has a first focal point P1 and a second focal point P2, while the second elliptical member 52 has a third focal point P3 and a fourth focal point P4. The second focal point P2 and the third focal point P3 are arranged at a common position. A first concave mirror 53 is arranged in a part of the elliptical member 51 and a second concave mirror 54 is arranged in a part of the second elliptical member 52.

More specifically, the optical system 14 of this display device includes a display element 55, an image forming element 56, the first concave mirror 53 formed as a part of the first elliptical member 51 having the first focal point P1 through which the light emitted from the display element 55 passes therethrough and the second focal point P2, and the second concave mirror 54 formed as a part of the second elliptical member 52 having the third focal point P3 arranged at the same position as the second focal point P2 and the fourth focal point P4.

The light emitted from the display element 55 is focussed on or near the first focal point P1, and the divergent light passing through the first focal point P1 is reflected by the first concave mirror 53, proceeds toward the common second and third focal points P2 and P3, and is focussed on or near those focal points. The divergent light passing through the second and third focal points P2 and P3 is reflected by the second concave mirror 54 and focussed on or near the fourth focal point P4, and the eye (pupil 24) of the observer is arranged on or near the fourth focal point P4. Thus, an image on display formed in front of the observer can be seen.

The display element 55 may be a liquid crystal panel of transmission type or reflection type having a light source, a display element of a small mirror that can form an image by scanning a minuscule light ray, or an EL display element of spontaneous light emission type. A light source separate from the display element 55 can also be provided.

The symmetry of the optical system can be improved by forming the first concave mirror 53 and the second concave mirror 54 using the first elliptical member 51 and the second elliptical member 52 with the second focal point P2 and the third focal point P3 arranged at a common point, or more preferably, by forming the first elliptical member 51 and the second elliptical member 52 as equivalent ellipsoids of revolution, as described above. As a result, the whole device can be reduced in size and weight by eliminating the need of using a plurality of complicated eccentric lenses as in the prior art.

The image forming element 56 may be a simple convex lens, and therefore it is possible to reduce the size of the first basic elliptical member 51 and the second basic elliptical member 52. Thus, the display device is reduced in size. Especially in the case where the display device is mounted on the face or head of the observer, the face should be free of any articles as far as possible, and the display element 55 and the eye of the observer are required to be apart from each other by a certain distance, and so the display element 55 is preferably arranged at a position a distance away from the face (such as at the side of the head). In view of this, the display device is desirably configured in an elongated form in the direction parallel to the face of the observer. In the present invention using the first elliptical member 51 and the second elliptical member 52, this requirement is met by configuring the display device appropriately in an elongated form parallel to the face of the observer without increasing the thickness in the direction perpendicular to the face of the observer.

In FIG. 18, the first focal point P1, the second focal point P2, the third focal point P3 and the fourth focal point P4 are arranged on a straight line, and the first concave mirror 53 is arranged on the opposite side of the line passing through the aforementioned focal points of the optical system from the second concave mirror 54.

Figure 19:
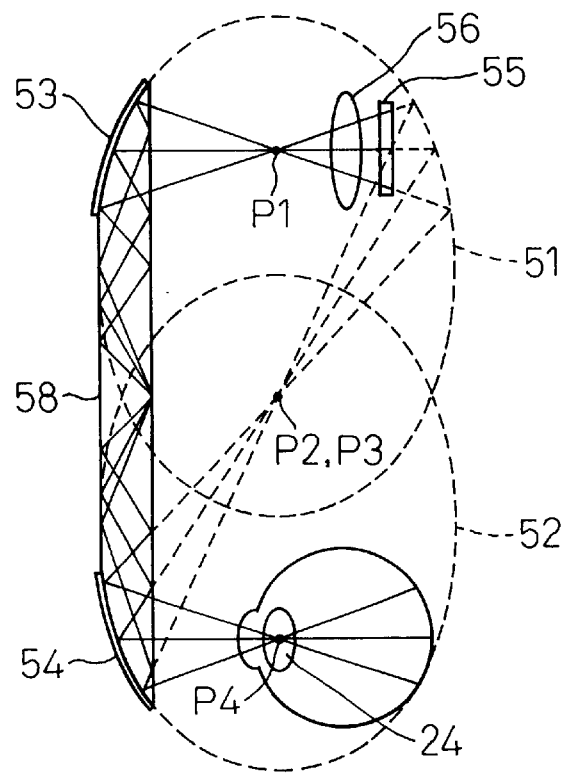
FIG. 19 is a view showing a modification of the optical system of FIG. 18.
Figure 20:
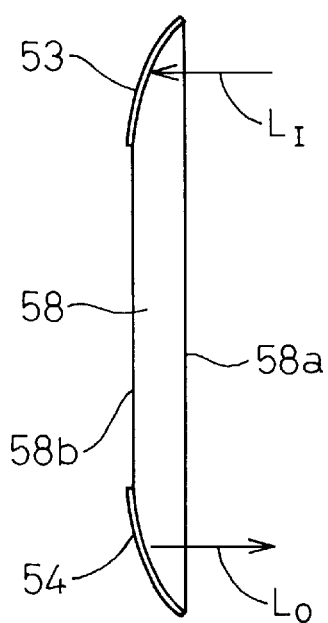
FIG. 20 is a view showing the light guide member of FIG. 19.

FIGS. 19 and 20 are views showing a modification of the optical system 14 of FIG. 18. In FIG. 19, the first focal point P1, the second focal point P2, the third focal point P3 and the fourth focal point P4 (or the focal points corresponding to the first to fourth focal points P1 to P4 developed from the reflection within the light guide member) are arranged on a straight line, and the first concave mirror 53 is arranged on the same side of the line passing through the aforementioned focal points of the optical system as the second concave mirror 54. A light guide member 58 is interposed between the first concave mirror 53 and the second concave mirror 54.

The light guide member 58 is made of an elongated transparent glass or plastics extending in parallel to the line passing through the first to fourth focal points P1 to P4, and has planes 58a and 58b parallel to each other. The first concave mirror 53 is arranged at the end of the light guide member 58, and the second concave mirror 53 is arranged at the other end of the light guide member 58. In this case, the light proceeds in the light guide member 58 and does not pass through the second and third focal points P2 and P3, but the manner of transmitting the light is the same as that of the light passing through the second and third focal points P2, P3.

Specifically, the light emitted from the display element 55 is focussed on or near the first focal point P1, and the light diverged from the first focal point P1 is reflected by the first concave mirror 53 and proceeds toward the common second and third focal point P2 and P3. The light is reflected several times by the surfaces (planes 58a and 58b) of the light guide member 58. Therefore, the light transmitted toward the common second and third focal point P2 and P3 from the first concave mirror 53 does not actually pass through the common second and third focal point P2, P3, but is focussed on an imaginary focal point in the light guide member 58 equivalent to the common second and third focal points P2 and P3. The divergent light passing through the imaginary focal point is focussed on or near the fourth focal point P4 after being reflected by the second concave mirror 54 as if the light passing through the imaginary focal point and being reflected by the second concave mirror 54 is equivalent to the light passing through the common second and third focal points P2 and P3 and being reflected by the second concave mirror 54. The eye (pupil 24) of the observer is arranged on or near the fourth focal point P4. Thus, an image on display formed in front of the eye of the observer can be seen.

The light guide member 58 of FIG. 19 is not limited to one having parallel planes 58a and 58b. For example, the first elliptical member 51 and the second elliptical member 52 may be configured to have different shapes, or the light guide member 58 may be designed so that the light enters the eye at an angle other than normal thereto. Also, the reflection film need not be added in the case where the light guide member 58 satisfies the conditions of total reflection.

In FIG. 20, the first concave mirror 53 and the second concave mirror 54 are arranged on the same side of the light guide member 58. The light enters the light guide member 58 in the direction of arrow $L_1$ and, after being reflected an odd number of times in the light guide member 58, exits from the light guide member 58 in the direction of arrow $L_0$.

Figure 21:
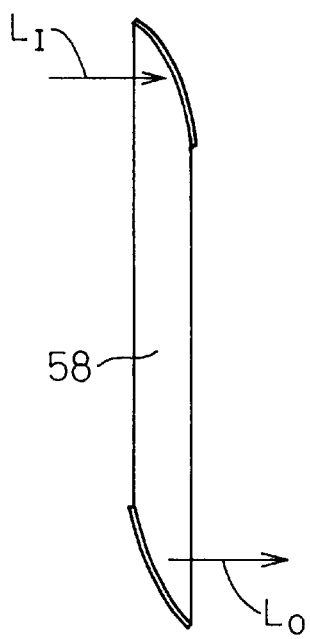
FIG. 21 is a view showing a modification of the light guide member of FIG. 19.

FIG. 21 is a view showing a modification of the light guide member 58. In this light guide member 58, the first concave mirror 53 and the second concave mirror 54 are arranged on the other side of the light guide member 58. The light enters the light guide member 58 in the direction indicated by arrow $L_1$ and, after being reflected an even number of times within the light guide member 58, exits from the light guide member 58 in the direction of arrow $L_0$.

Figure 22:
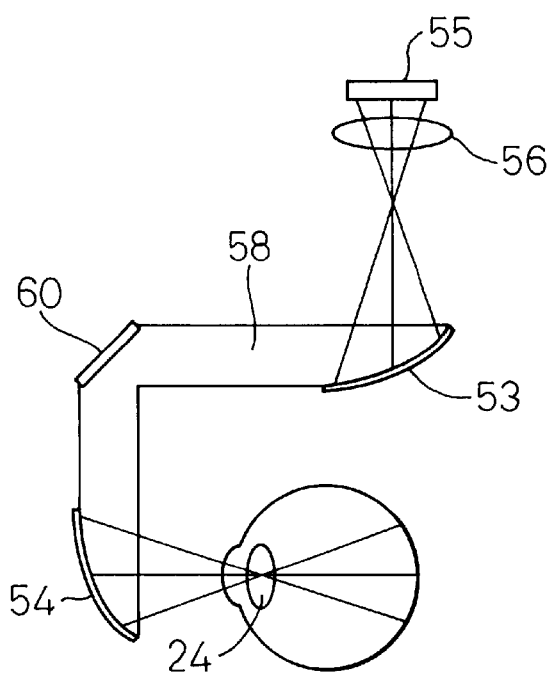
FIG. 22 is a view showing a modification of the light guide member of FIG. 19.

FIG. 22 is a view showing a modification of the light guide member 58. This light guide member 58 has a bent portion and is formed in the shape fitted to one half of the face and head of the observer. The bent portion is formed with a reflection film 60. In the case where the conditions for total reflection are satisfied, however, the reflection film 60 is not required. By doing so, the freedom of arrangement of the display element 55 is increased.

Figure 23:
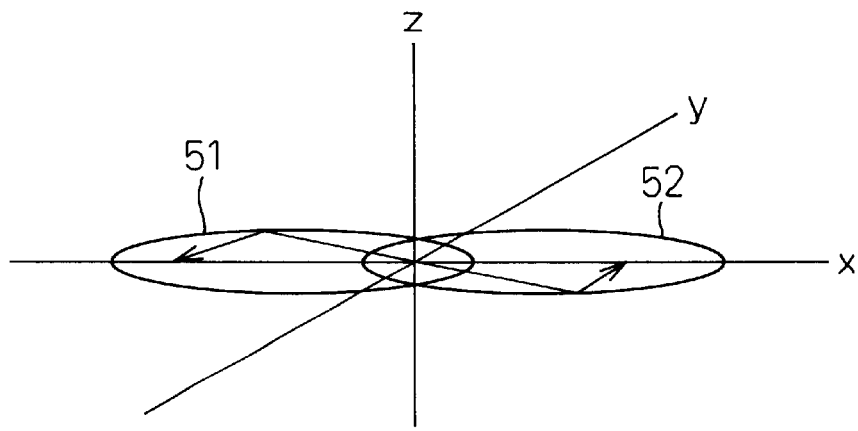
FIG. 23 is a view showing the first elliptical member and the second elliptical member of the display device explained with reference to FIGS. 18 to 23.

FIG. 23 is a view showing the first elliptical member 51 and the second elliptical member 52 of the display apparatus described with reference to FIGS. 18 to 23. In FIG. 23, the first elliptical member 51 and the second elliptical member 52 are arranged in the X-Y plane, for example.

Figure 24:
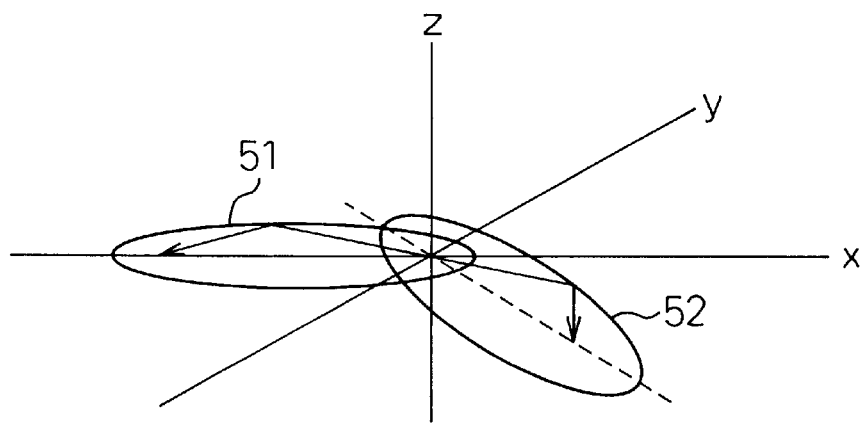
FIG. 24 is a view showing the first elliptical member and the second elliptical member arranged three-dimensionally.

FIG. 24 is a view showing a modification of the optical system of FIG. 23, in which the first elliptical member 51 and the second elliptical member 52 are arranged three-dimensionally. In FIG. 24, the first elliptical member 51 is arranged in the X-Y plane, and the second elliptical member 52 is arranged in a plane at an angle to the X-Y plane. The first concave mirror 53 and the second concave mirror 54 are not shown in FIGS. 23, 24. The first and fourth focal points P1 and P4 are indicated by arrows, while the second and third focal points P2 and P3 correspond to the origin of the coordinate in FIGS. 23 and 24. The second and third focal points P2 and P3 are commonly shared, and therefore the light propagation principle described above is also applicable to this case.

Figure 25:
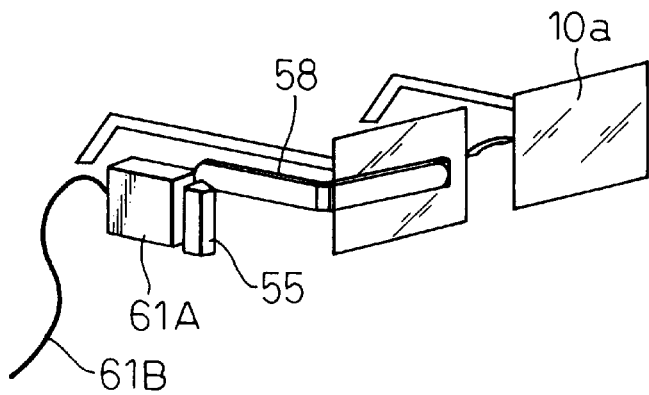
FIG. 25 is a view showing a display device including the optical system of FIG. 24.

FIG. 25 is a view showing a display device including the optical system of FIG. 24. The body structure of the display device is diagrammatically shown as a spectacle 10a. The optical system includes a display element 55 and a light guide member 58. The other members of the optical system are not shown. The light guide member 58 of FIG. 25 is modified from the light guide member 58 of FIG. 22 in accordance with the configuration of the first elliptical member 51 and the second elliptical member 52 shown in FIG. 24. In FIG. 22, the light guide member 58 is bent and the second concave mirror 54 is located immediately in front of the eye. The first concave mirror 53 and the display element 55 are located beside the ear, for example, and the display element 55 is located outside of the first concave mirror 53.

The light guide member 58 of FIG. 25 is bent in the same manner as the light guide member 58 of FIG. 22. The second concave mirror 54 is located immediately in front of the eye. The first concave mirror 53 and the display element 55 are located beside the ear, for example. In this case, in accordance with the configuration of the first elliptical member 51 and the second elliptical member 52 shown in FIG. 24, the display element 55 is located under the first concave mirror 53. Numeral 61A designates a circuit unit, and numeral 61B a cable.

Figure 26:
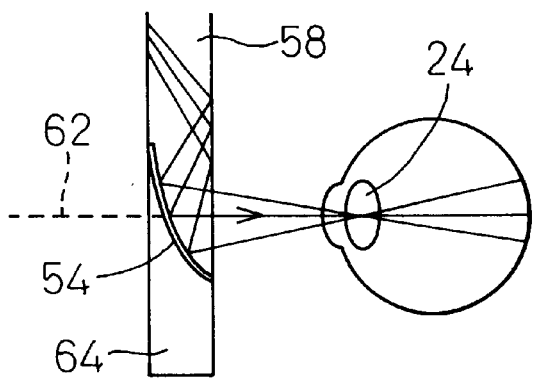
FIG. 26 is a view showing an example of the optical system having the see-through function added thereto.
Figure 27:
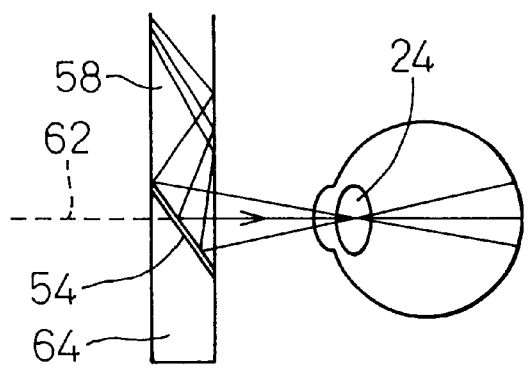
FIG. 27 is a view showing a modification of the optical system of FIG. 26.
Figure 28:
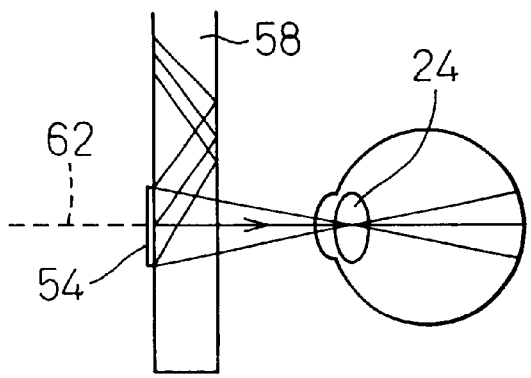
FIG. 28 is a view showing a modification of the optical system of FIG. 26.

FIGS. 26 to 28 are views showing an example of an optical system having a see-through function in addition. In FIG. 26, the second concave mirror 54 is a reflector having a half-transmitting property. The second concave mirror 54 can be formed of a multilayer dielectric film or a film of chromium, aluminum, silver, titanium or the like. An arbitrary transmittance can be selected by designing the material and thickness of the film. For providing the see-through function, it is necessary that the background light 62 can pass through the second concave mirror 54 but with a small refraction and a small distortion of the background image. This in turn requires the parallelism between the incident surface and the exit surface of the back ground light 62, and a correcting plate 64 is preferably attached to the light guide member 58.

In FIG. 27, the second concave mirror 54 is formed of a hologram. In this case, the second concave mirror 54 is flat. Since the second concave mirror 54 is formed as a hologram, however, the reflection similar to that for a part of the second elliptical member 52 can be realized as described above, and the transmittance can be controlled. The second concave mirror 54 is flat, and therefore the shape of the correcting plate 64 is also simplified.

In FIG. 28, the second concave mirror 54 formed by a hologram is arranged on the flat surface of a light guide member 58. By doing so, the correcting plate 64 need not be added.

Figure 29:
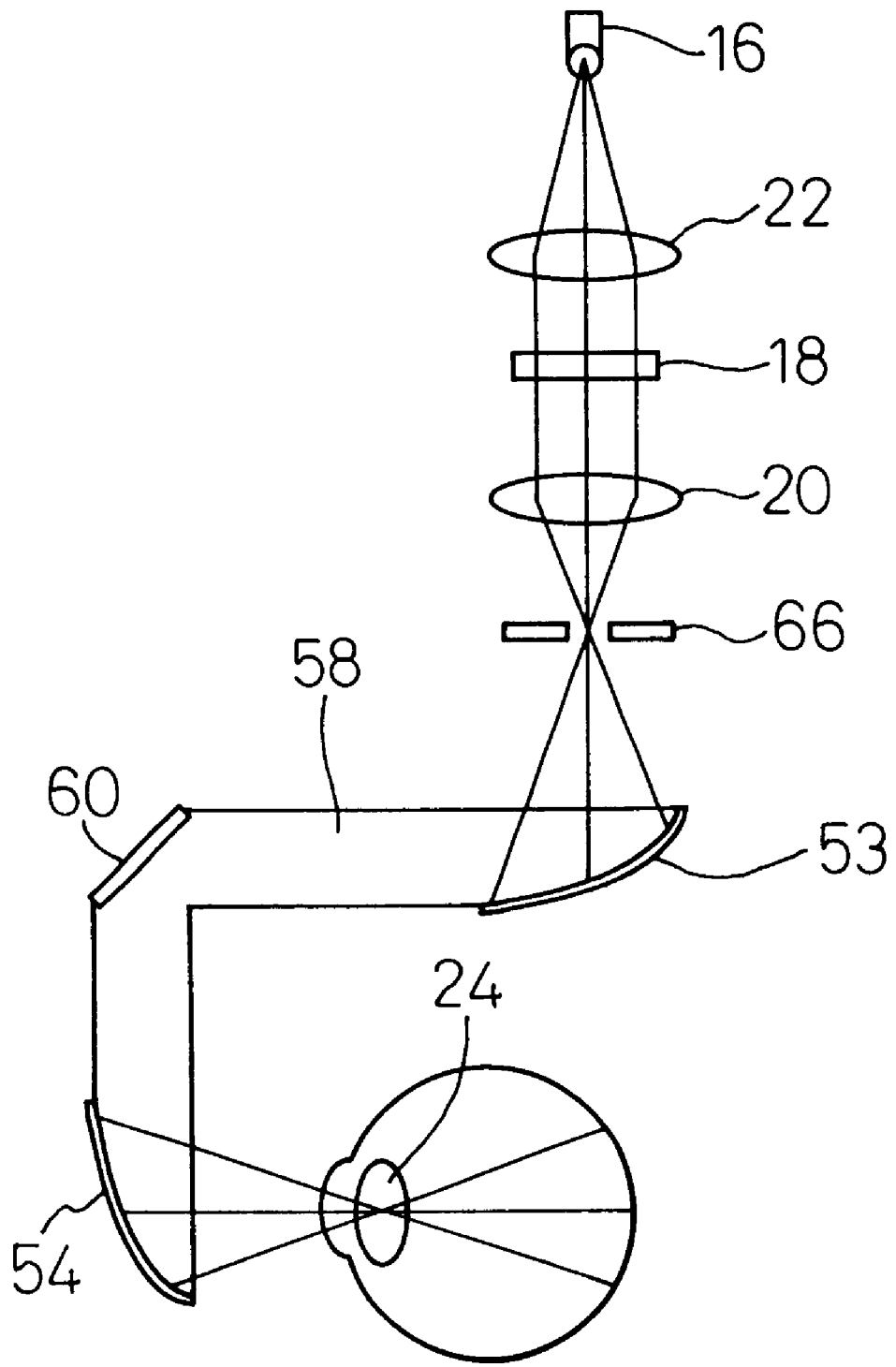
FIG. 29 is a view showing another modification of the optical system according to the present invention.
Figure 30:
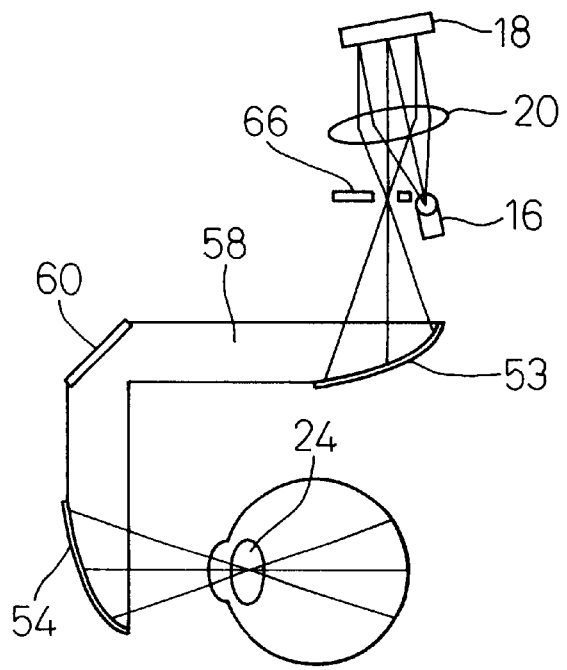
FIG. 30 is a view showing still another modification of the optical system according to the present invention.
Figure 31:
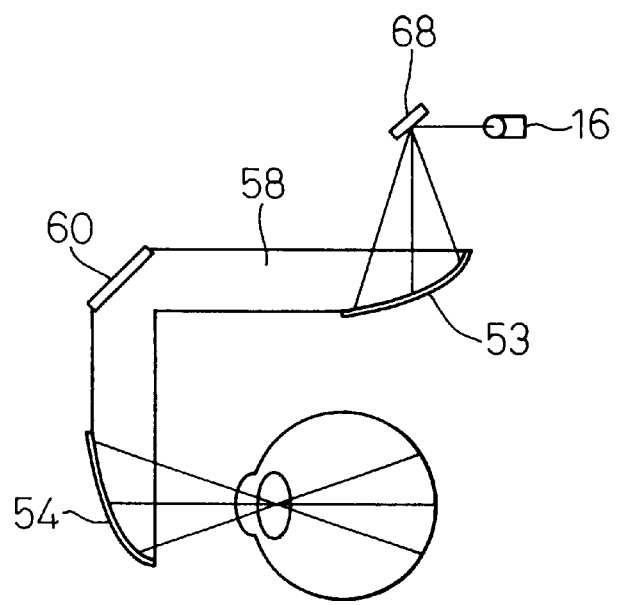
FIG. 31 is a view showing yet another modification of the optical system according to the present invention.

FIGS. 29 to 31 are views showing still further modifications of the optical system according to the present invention.

FIG. 29 shows an optical system which is a combination of the first optical system shown in FIG. 1 and the second optical system shown in FIG. 22. Specifically, the first optical system includes a light emitting element 16, an optical element 22, a transmission type display element 18 and an image forming element 20. An aperture 66 is arranged at the position of the second focal point of the image forming element 20. The second optical system includes a first concave mirror 53, a second concave mirror 54 and a light guide member 58. In similar manner, in the arrangement of FIG. 18 in which the divergent light emitted from the display element 55 is directed to the first concave mirror 53 through the first focal point P1, the divergent light passing through the aperture 66 is directed to the first concave mirror 53. The aperture 66 is located at the first focal point P1 of the second optical system. As a result, an image similar to the image recognized at the aperture 66 can be recognized at the pupil 24.

In FIG. 30, the reflection type display element 18 is used. The remaining configuration is similar to that of FIG. 29.

In FIG. 31, the display element includes a light emitting element 16 and a micromirror 68. The light emitting element 16 can be a laser or the like. The light emitting element 16 emits a minuscule light ray toward the micromirror 68. The micromirror 68 is a device of which the angle can be changed like a MEMS (microelectro-mechanical system), and the light rays can be scanned. By modulating the amount of light of the light emitting element 16 in accordance with this scanning, an image is formed. The micromirror 68 is very small as compared with the liquid crystal panel and can realize a compact display element. In the drawing, only one micromirror 68 is shown, but by using two simple MEMSs, the scanning in the X and Y directions can be realized.

Figure 32:
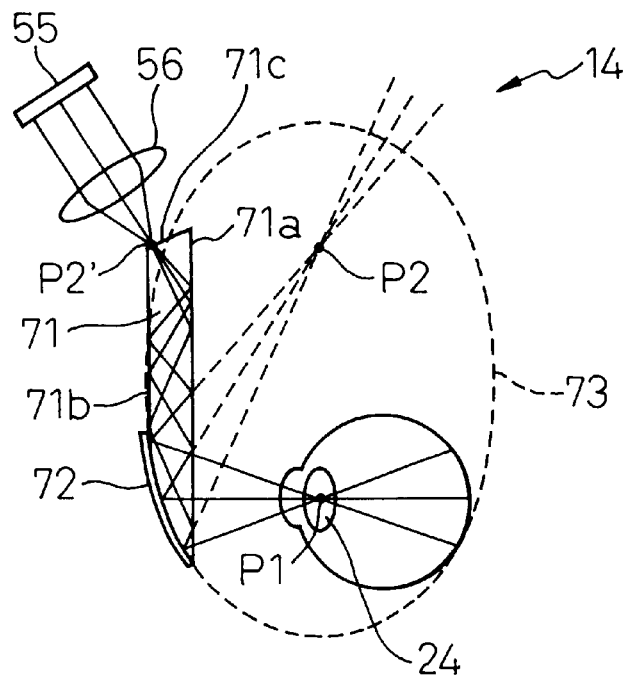
FIG. 32 is a view showing another embodiment of the optical system of the display device of FIG. 3.

FIG. 32 is a view showing a further embodiment of the optical system of the display apparatus of FIG. 3. In this example, the optical system 14 includes a display element 55, an image forming element 56, a light guide member 71 and a concave mirror 72. The light guide member 71 is made of a transparent material such as glass or resin and has parallel flat surfaces 71a and 71b and a flat light incident surface 71c. The concave mirror 72 is formed on the end the light guide member 71 on the side thereof far from the light incident surface 71c. The concave mirror 72 is formed based on a part of the ellipsoid of revolution 73 having the first focal point P1 and the second focal point P2. The surfaces 71a and 71b of the light guide member 71 are parallel to a line passing through the first focal point P1 and the second focal point P2 of the concave mirror 72.

The light emitted from the display element 55 and passing through the image forming element 56 enters the light incident surface 71c of the light guide member 71 and is focussed on or near an imaginary focal point P2' on the light incident surface 71c. The divergent light passing through the imaginary focal point P2' is reflected several times repeatedly (total reflection) by the surfaces 71a and 71b of the light guide member 71, and enters the concave mirror 72 in the same manner as if it had entered the concave mirror 72 from the second focal point P2. The light reflected by the concave mirror 72 is focussed on or near the first focal point P1 and enters the eye (pupil 24) of the observer. Thus, an image on display formed in front of the eye of the observer can be seen. The light that does pass through the imaginary focal point P2' may cause noise, and therefore an aperture is desirably arranged at the position of the imaginary focal point P2'.

In this way, by arranging the light guide member 71 sideways with respect to the face of the observer, a display device can be configured in such a manner that the display element 55 and the image forming element 56 do not interfere with the side of the head (the portion near the ear) of the observer.

The light incident surface 71c is desirably formed at an angle to the flat surfaces 71a and 71b so that the light emitted from the display element 55 and passing through the image forming element 56 enters the light incident surface 71c in the direction normal thereto. In view of the fact that the reflection angle of the light on the elliptical concave mirror 72 changes on the two sides of the optical axis, however, the image entering the pupil 24 may be distorted. The distortion of the image can be relaxed by adjusting the angle of the light incident surface 71c, or by inserting a distortion correcting lens between the display element 55 and the light incident surface 71c. Also, a compact and lightweight display device can be realized.

Figure 33:
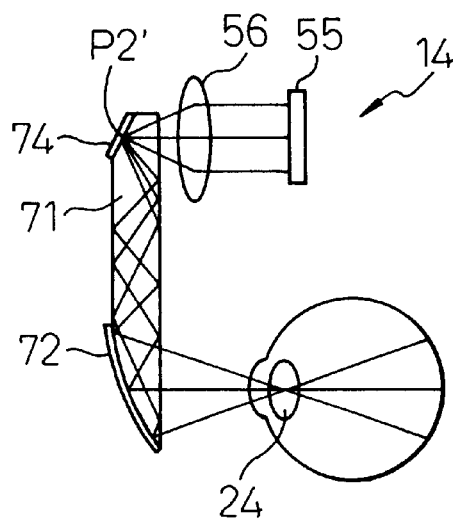
FIG. 33 is a view showing a modification of the optical system of FIG. 32.
Figure 34:
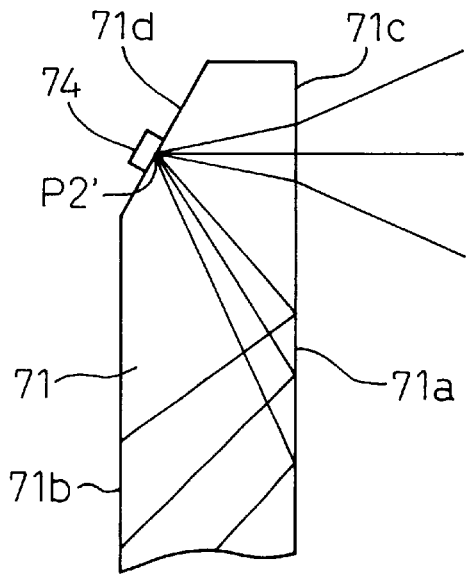
FIG. 34 is an enlarged view showing a part of the light guide member of FIG. 33.

FIG. 33 is a view showing a modification of the optical system 14 of FIG. 32. FIG. 34 is a partly enlarged view of the light guide member of FIG. 33. In FIG. 32, the display element 55 and the image forming element 56 are arranged on the side far from the face of the observer. In the case of FIGS. 33 and 34, on the other hand, the display element 55 and the image forming element 56 are arranged on the side nearer to the face of the observer. By doing so, the display element 55 and the image forming element 56 can be easily arranged on the side of the head (near the ear) of the observer.

For this purpose, the light incident surface 71c of the light guide member 71 is formed as a part of the surface 71a, and a reflection film 74 is arranged on the inclined surface 71d constituting the light incident surface 71c in FIG. 32. The reflection film 74 may be replaced with a total reflection surface. Thus, the light passing through the display element 55 and the image forming element 56 enters the light guide member 71 from the light incident surface 71c, and after being reflected by the reflection surface of the reflection film 74, is focussed on or near the imaginary focal point P2' on the reflection film 74. As described above, the divergent light passing through the imaginary focal point P2' is reflected several times repeatedly (total reflection) by the surfaces 71a, 71b of the light guide member 71, and the light entering and reflected by the concave mirror 72 is focussed on or near the first focal point P1, thus entering the eye (pupil 24) of the observer. In this way, an image on display formed in front of the eye of the observer can be seen.

The imaginary focal point P2' is a convergent point, and therefore the reflection film 74 may be small. The reflection film 74 is formed by evaporating a material of the reflection film such as a multilayer film of metal including aluminum or silver or an oxide thereof only on a part of the inclined surface 71d of the light guide member 71, while allowing the incident light to pass through the other portions of the inclined surface 71d. By doing so, the function of the aperture described with reference to the example of FIG. 32 is added, and the light not passing through the imaginary focal point P2' is prevented from constituting an optical noise. Also, a light absorption layer may be formed on the non-reflection portion of the inclined surface 71d. For example, a black material such as chromium oxide or black ink may be coated on the entire inclined surface 71d after forming the reflection film 74.

Figure 35:
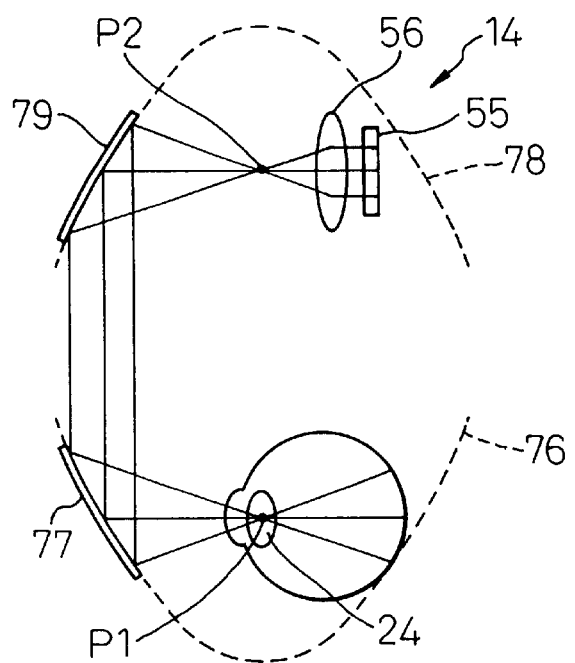
FIG. 35 is a view showing still another embodiment of the optical system of the display device of FIG. 3.

FIG. 35 is a view showing a further embodiment of the optical system of the display apparatus shown in FIG. 3. This example of the optical system 14 includes a display element 55, an image forming element 56, a first concave mirror 77 formed based on a part of the surface of a first paraboloid of revolution 76 having the first focal point P1, and a second concave mirror 79 formed based on a part of the surface of a second paraboloid of revolution 78 having the second focal point P2.

The light emitted from the display element 55 and passing through the image forming element 56 is focussed on or near the second focal point P2 of the surface of the second paraboloid of revolution 78, and the divergent light passing through the second focal point P2 is converted into parallel light rays by being reflected by the second concave mirror 79. The parallel light enters the first concave mirror 77 and the light reflected by the first concave mirror 77 is focussed on or near the first focal point P1 and enters the eye (pupil 24) of the observer. In this way, an image on display formed in front of the observer can be seen.

As described above, a compact, lightweight display device can be realized by allowing parallel light rays to enter the first concave mirror 77. The second concave mirror 79 is used as a means for producing the parallel light rays. Preferably, the first paraboloid of revolution 76 and the second paraboloid of revolution 78 are arranged to have the same focal length and the center axes coincident with each other. By doing so, an image of high symmetry free of distortion can be formed. The light that does not pass through the second focal point P2 may cause noise, and therefore the noise can be suppressed by forming an aperture at the second focal point P2.

The first and second reflectors 77 and 79 are mounted on an appropriate holder. A space is formed between the first reflector 77 and the second reflector 79, and the parallel light proceeds through the space.

Figure 36:
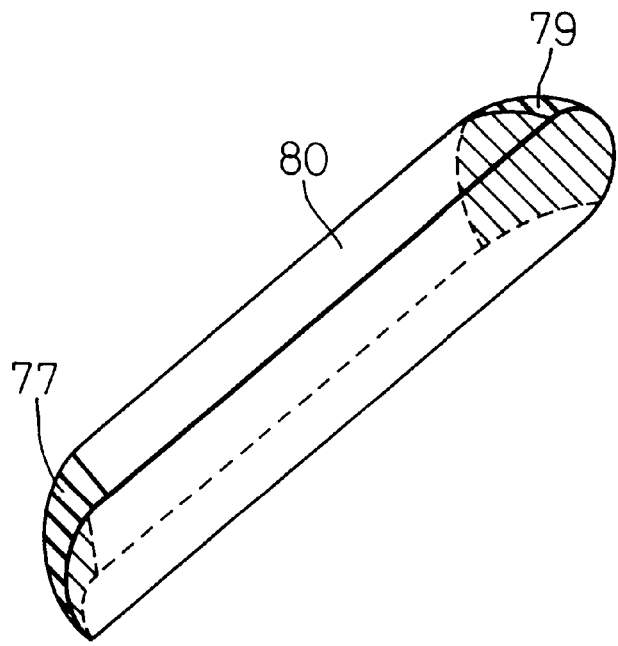
FIG. 36 is a view showing an example of arrangement of the first and second reflectors of FIG. 35.
Figure 37:
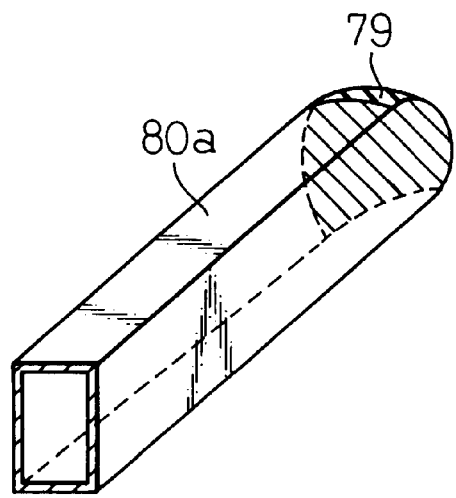
FIG. 37 is a view showing an example of arrangement of the first and second reflectors of FIG. 35.

FIGS. 36 and 37 are views showing examples of the arrangement of the first and second reflectors 77 and 79. In FIG. 36, the first and second reflectors 77 and 79 are arranged at the two ends of the light guide member 60 made of a prismatic glass or a plastic such as acrylic resin. The light is propagated through the light guide member 80 as parallel light. The light guide member 80 is formed using a mold, and the first and second reflectors 77 and 79 are formed by evaporating aluminum at the ends of the light guide member 80.

In FIG. 37, the first and second reflectors 77 and 79 are arranged at the ends of a hollow prismatic light guide member 80a (the first reflector 77 is not shown). The light propagates as parallel light rays through the hollow portion in the light guide member 80a. The light guide member 80a is formed using a mold. The first and second reflectors 77 and 79 are made separately, and bonded to the ends of the light guide member 80a. The arrangement can be such that air exists in the light guide member 80a, but the light guide member 80 is desirably sealed in order to keep dust off the mirror surface. Also, for protection from dewing, the interior of the light guide member 80a may be filled with a gas like nitrogen gas or evacuated.

Figure 38:
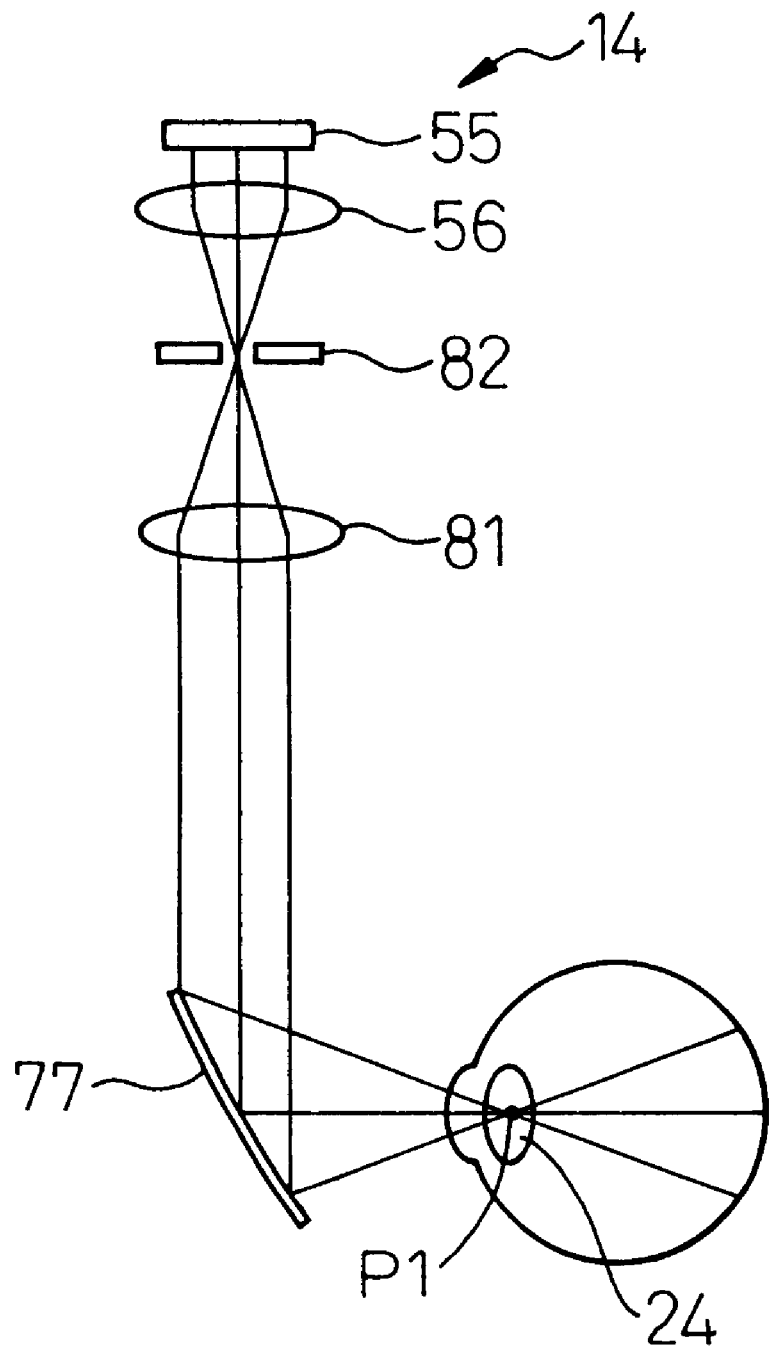
FIG. 38 is a view showing a modification of the optical system of the display device of FIG. 35.

FIG. 38 is a view showing a modification of the display apparatus of FIG. 35. This example of the optical system 14 includes a display element 55, an image forming element 56, a first concave mirror 77 formed based on a part of the first paraboloid of revolution 76 having the first focal point P1 and a lens 81 for converting the light emitted from the display element 55 and passing through the image forming element 56 into parallel light rays. An aperture 82 is arranged at the position of the focal point of the image forming element 56. The parallel light produced by the lens 81 enters the first concave mirror 77, and the light reflected by the first concave mirror 77 is focussed on or near the first focal point P1, and enters the eye (pupil 24) of the observer. Thus, an image on display formed forward of the eye of the observer can be seen.

Figure 39:
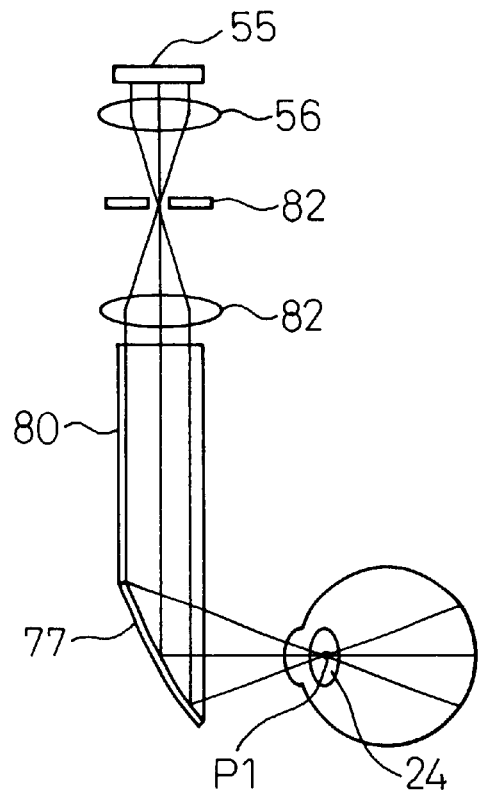
FIG. 39 is a view showing a modification of the optical system of the display apparatus of FIG. 38.

FIG. 39 is a view showing a modification of the optical system of the display apparatus of FIG. 38. This example of the optical system 14 is the same as that shown in FIG. 38 except that the first concave mirror 77 is arranged at the end of the light guide member 80. The concave mirror having a paraboloidal surface, as compared with an ordinary spherical lens, has a complicated shape and is not easily processed. Thus, the number of concave mirrors of the paraboloidal surface is desirably as small as possible. In FIGS. 38 and 39, therefore, one paraboloidal concave mirror is used. Although the illustrated example of the incident surface of the light guide member 80 is flat, the incident surface of the light guide member 80 may have a shape having the function of the image forming element 56. Also, in the case where the light entering the display element 55 is a convergent light, the image forming element 56 can be omitted.

Figure 40:
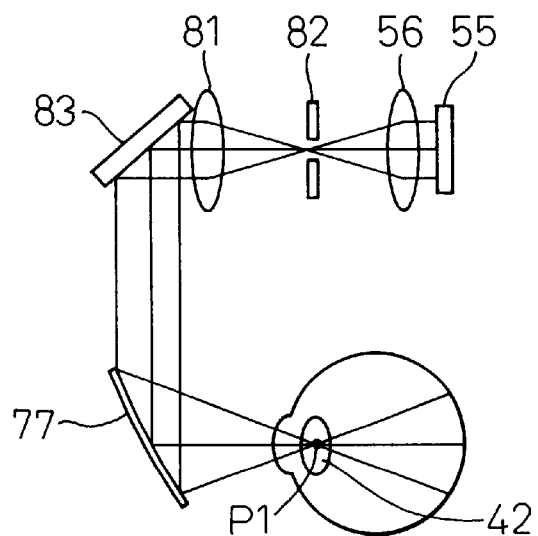
FIG. 40 is a view showing a modification of the optical system of the display apparatus of FIG. 38.
Figure 41:
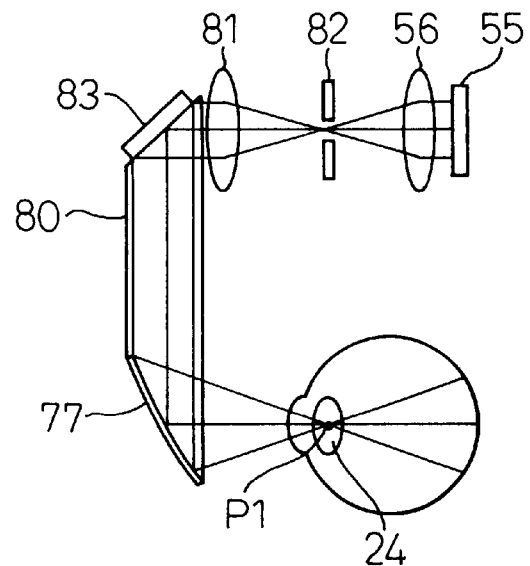
FIG. 41 is a view showing a modification of the optical system of the display apparatus of FIG. 39.

FIGS. 40 and 41 are views showing modifications of the optical system of the display device shown in FIGS. 38 and 39, respectively. In FIG. 40, a reflection film 83 is inserted between the lens 81 and the first concave mirror 77 thereby to bend the light path. In FIG. 40, the reflection film 83 is inserted between the lens 81 and the end of the light guide plate 80 thereby to bend the light path. By doing so, many optical parts can be arranged at positions distant from the face of the observer, i.e. at positions nearer to the side head portion (near the ear) of the observer. In the case where the gravitational center of the display device is located at a position near the face, the observer feels the weight and is liable to be tired when the display device is mounted. For realizing the natural feeling of mounting, parts are desirably not located near the face as much as possible. By the way, instead of using the reflection film 83, the total reflection surface may be employed.

Figure 42:
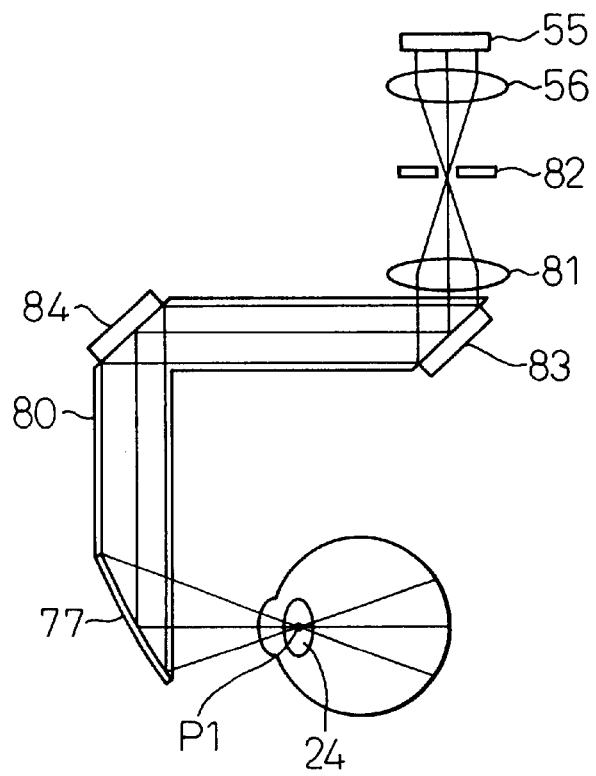
FIG. 42 is a view showing a modification of the optical system of the display apparatus of FIG. 41.

FIG. 42 is a view showing a modification of the optical system of the display device shown in FIG. 41. In this example, the light guide plate 80 is formed at the right angle, the reflection film 83 is inserted between the lens 81 and the end of the light guide plate 80, and the reflection film 84 is inserted in the bent portion of the light guide plate 80 thereby to bend the light path. By the way, the reflection films 83 and 84 may be replaced with the total reflection surface. By doing so, the configuration of the display device can be fitted better on the face and head of the observer. In the illustrated example, the portions of the device ranging from the display element 55 to the lens 81 are arranged in the direction protruded outward from the side of the head of the observer. Nevertheless, the surface of the end portion of the light guide plate 80 with the reflection film 83 arranged thereon can be formed at the angle of 45° to the sheet of the drawing, and the portions of the device ranging from the display element 55 to the lens 81 can be directed downward from the light guide member 80. By doing so, the portions of the device ranging from the display element 55 to the lens 81 can be hung on the ear like the sidepieces of the spectacle.

The display device shown in FIG. 42 can be used in the same way as the display device shown in FIG. 25, for example.

Figure 43:
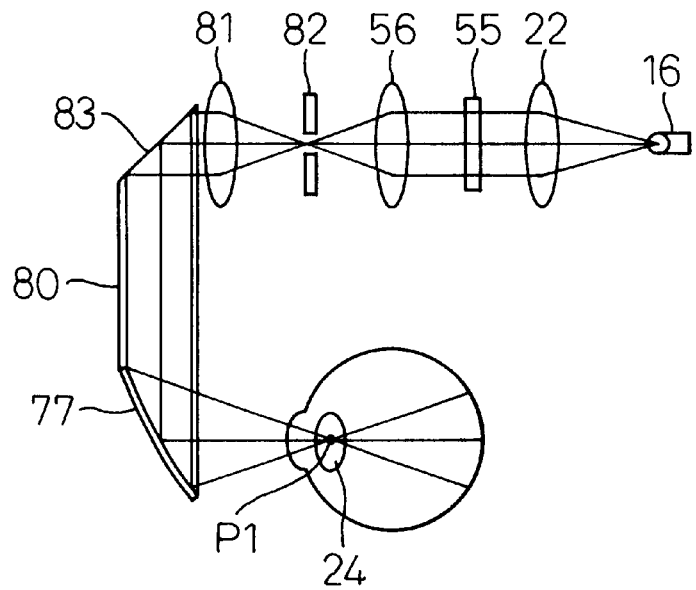
FIG. 43 is a view showing a modification of the optical system of the display apparatus of FIG. 40.

FIG. 43 is a view showing a modification of the optical system of the display apparatus of FIG. 40. In this example, the light emitting element 16 and the optical element 22 of the first optical system shown in FIG. 1 are added to the optical system of FIG. 40. The light emitting element 16 and the optical element 22 produce parallel light rays, the light passing through the display element 55 and the image forming element 56 is focussed on the aperture 82. The divergent light passing through the aperture 82 is led to the light guide member 80 and the light reflected by the first concave mirror 77 enters the pupil 24. As a result, an image similar to the image recognized at the aperture 82 can be recognized at the pupil 24.

Figure 44:
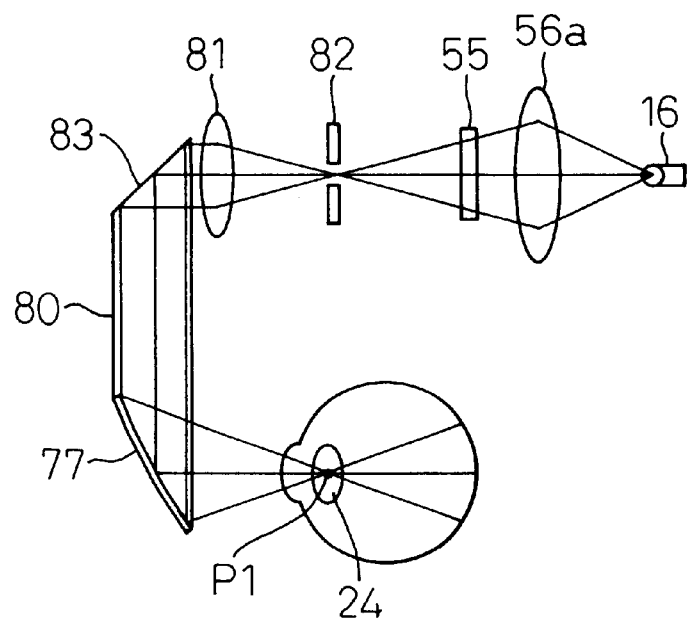
FIG. 44 is a view showing a modification of the optical system of the display apparatus of FIG. 41.

FIG. 44 is a view showing a modification of the optical system of the display apparatus shown in FIG. 41. In this example, the light emitting element 16 is provided and the image forming element 56a is arranged in front of the light emitting element 16. The light passing through the light emitting element 16 and the image forming element 56a is focussed on the aperture 82. The divergent light passing through the aperture 82 is led to the light guide member 80 and the light reflected by the first concave mirror 77 enters the pupil 24. As a result, an image similar to the image recognized at the aperture 82 can be recognized at the pupil 24.

Figure 45:
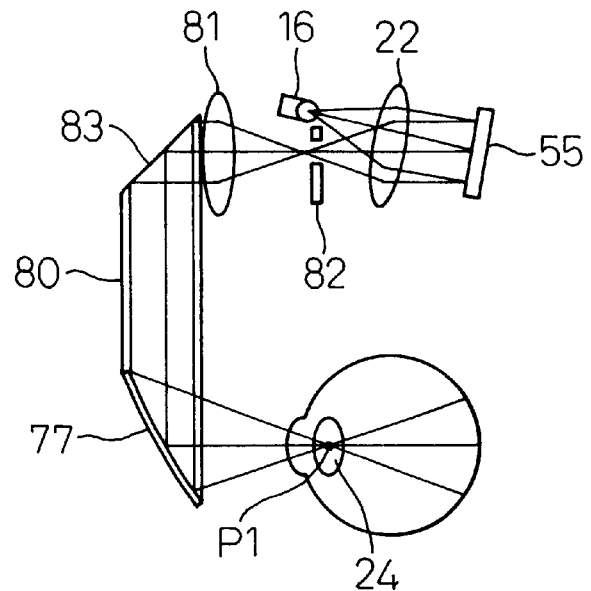
FIG. 45 is a view showing a modification of the optical system of the display apparatus of FIG. 43.

FIG. 45 is a view showing a modification of the optical system of the display apparatus of FIG. 43. In FIG. 45, the reflection type display element 55 is used. The other configuration is similar to that of FIG. 43.

Figure 46:
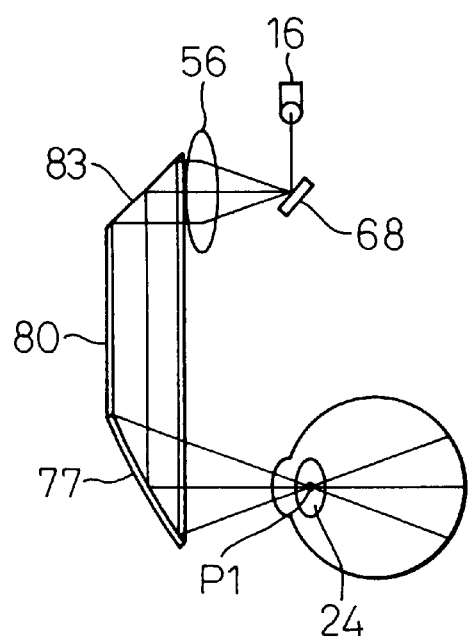
FIG. 46 is a view showing a modification of the optical system of the display apparatus of FIG. 44.

FIG. 46 is a view showing a modification of the optical system of the display apparatus of FIG. 43. In FIG. 46, as in FIG. 31, the display element includes the light emitting element 16 and the micromirror 68. The light emitting element 16 can be a laser or the like. The light emitting element 16 emits a minuscule light ray toward the micromirror 68. The micromirror 68, which is a device capable of changing the angle like an MEMS, can scan the light ray. By modulating the amount of light of the light emitting element 16 in accordance with this scanning, an image is formed. Although only one micromirror 68 is shown in the drawing, two simple MEMSs can be used for scanning in the X and Y directions.

In FIGS. 43 to 46, the first concave mirror 77 in the paraboloidal shape are used. In place of the first concave mirror 77 in the paraboloidal shape, however, the concave mirror 72 in the elliptical shape shown in FIGS. 32 to 34 can be used.

As described above, according to the present invention, a compact display device capable of being produced at low cost can be obtained. Also, according to the present invention, a very compact display device capable of being mounted on the head can be realized.

What is claimed is:

1. A display device arranged in front of an eye of an observer, comprising:

a light emitting element;

a display element illuminated by said light emitting element; and an image forming element allowing light passing through said display element to pass therethrough;

wherein said display element is arranged between said image forming element and a first focal point of said image forming element at a position near to said first focal point of said image forming element, said image forming element both transmitting and reflecting light, and forming a virtual image of said display element, and said light emitting element having its emitted light focused by said image forming element at a second focal point of said image forming element.

2. A display device according to claim 1, further comprising an optical element arranged between said light emitting element and said display element for converting the light incident to said display element into a parallel light.

3. A display device according to claim 2, wherein the display element is a transmission type display element, the optical element is arranged on one side of the display element, and the image forming element is arranged on the other side of the display element.

4. A display device according to claim 2, wherein the display clement is a reflection type display element, and the optical element and the image forming element are formed by a common element.

* * * * *

UNITED STATES PATENT AND TRADEMARK OFFICE
CERTIFICATE OF CORRECTION

PATENT NO. : 6,690,516 B2
DATED : February 10, 2004
INVENTOR(S) : Aritake et al.

It is certified that error appears in the above-identified patent and that said Letters Patent is hereby corrected as shown below:

Title page,
Item [75], Inventors, delete "Seiichi Saito".

Signed and Sealed this

Fourth Day of January, 2005

JON W. DUDAS
*Director of the United States Patent and Trademark Office*